(12) United States Patent
Wolff et al.

(10) Patent No.: US 11,310,792 B2
(45) Date of Patent: *Apr. 19, 2022

(54) SYSTEMS AND METHODS FOR DYNAMICALLY ADJUSTING SUBFRAMES

(71) Applicant: Verizon Patent and Licensing Inc., Arlington, VA (US)

(72) Inventors: David P. Wolff, Irvine, CA (US); Nischal Patel, Gilberts, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,302

(22) Filed: Mar. 27, 2020

(65) Prior Publication Data

US 2020/0229184 A1 Jul. 16, 2020

Related U.S. Application Data

(63) Continuation of application No. 16/129,224, filed on Sep. 12, 2018, now Pat. No. 10,638,475.

(51) Int. Cl.
*H04W 72/04* (2009.01)
*H04W 4/02* (2018.01)
(52) U.S. Cl.
CPC ....... *H04W 72/0446* (2013.01); *H04W 4/023* (2013.01)
(58) Field of Classification Search
CPC .................................................. H04W 4/023
See application file for complete search history.

(56) References Cited

U.S. PATENT DOCUMENTS

| | | | |
|---|---|---|---|
| 7,359,727 | B2 | 4/2008 | Tsien et al. |
| 7,403,748 | B1 | 7/2008 | Keskitalo et al. |
| 2007/0115796 | A1 | 5/2007 | Jeong et al. |
| 2008/0165727 | A1 | 7/2008 | Xiaoben et al. |
| 2010/0124927 | A1 | 5/2010 | Eskicioglu et al. |
| 2010/0267397 | A1 | 10/2010 | Shen et al. |
| 2012/0039191 | A1 | 2/2012 | Foster et al. |
| 2013/0107704 | A1 | 5/2013 | Dinan |
| 2013/0142062 | A1 | 6/2013 | Dinan |
| 2013/0170376 | A1 | 7/2013 | Dinan |
| 2013/0198767 | A1 | 8/2013 | Wang et al. |
| 2013/0237245 | A1 | 9/2013 | Tinnakornsrisuphap et al. |
| 2014/0080492 | A1* | 3/2014 | Shoshan ............... H04W 16/32 455/449 |
| 2014/0126403 | A1 | 5/2014 | Siomina |
| 2014/0126527 | A1 | 5/2014 | Xiong et al. |
| 2014/0128115 | A1 | 5/2014 | Siomina et al. |

(Continued)

OTHER PUBLICATIONS

Yih, Chi-Hsiao, "Effects of Channel Estimation Error on the BER Performance of OFDM Systems in Multipath Rayleigh Fading Channels," 2007 IEEE 66th Vehicular Technology Conference, 2007, 5 pages.

(Continued)

*Primary Examiner* — Melanie Jagannathan

(57) ABSTRACT

A device receives information associated with one or more user equipments (UEs) communicatively connected with the device. The device generates a score based on the information associated with the one or more UEs and adjusts, based on the score, one or more subframe parameters associated with the device.

20 Claims, 13 Drawing Sheets

(56) References Cited

U.S. PATENT DOCUMENTS

| | | |
|---|---|---|
| 2014/0155022 A1 | 6/2014 | Kandregula |
| 2014/0243017 A1 | 8/2014 | Das et al. |
| 2014/0301370 A1 | 10/2014 | Sivavakeesar |
| 2015/0043392 A1* | 2/2015 | Susitaival ......... H04W 72/0446 370/280 |
| 2015/0087238 A1 | 3/2015 | Palanki et al. |
| 2015/0264683 A1* | 9/2015 | Kim .................... H04L 5/0007 370/329 |
| 2015/0341753 A1 | 11/2015 | Chen et al. |
| 2016/0330660 A1* | 11/2016 | Wong .................. H04B 17/318 |
| 2018/0049182 A1 | 2/2018 | Luo et al. |
| 2018/0124718 A1 | 5/2018 | Ng et al. |
| 2018/0343056 A1 | 11/2018 | Radulescu et al. |
| 2018/0367355 A1 | 12/2018 | Pan et al. |
| 2019/0045477 A1 | 2/2019 | Edge |
| 2019/0082359 A1 | 3/2019 | Wei et al. |
| 2019/0150019 A1 | 5/2019 | Saito et al. |
| 2019/0238256 A1 | 8/2019 | Xing et al. |
| 2019/0357259 A1* | 11/2019 | Zhang ............... H04W 74/0833 |
| 2020/0412417 A1* | 12/2020 | Calzolari ............. H04B 7/0608 |

OTHER PUBLICATIONS

Songping Wu, "Phase Noise Effects on OFDM: Analysis and Mitigation," May 2004, 125 pages.

* cited by examiner

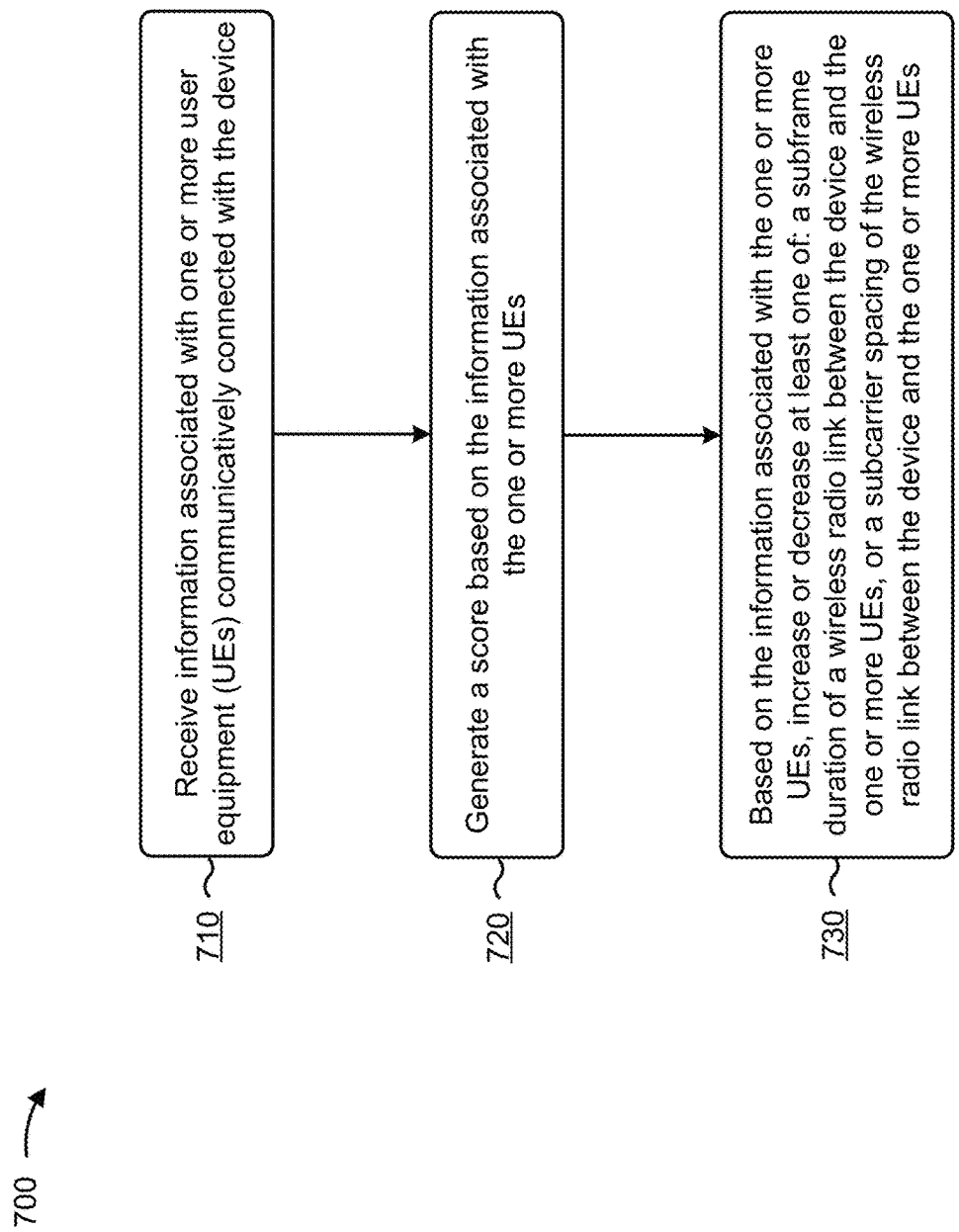

SYSTEMS AND METHODS FOR DYNAMICALLY ADJUSTING SUBFRAMES

RELATED APPLICATION

This application is a continuation of U.S. patent application Ser. No. 16/129,224, filed Sep. 12, 2018, which is incorporated herein by reference.

BACKGROUND

A base station may communicate with one or more pieces and types of user equipment (UE), and/or vice-versa, over a wireless radio link. Information transmitted between the one or more UEs and the base station may be encoded in wireless communications between the one or more UEs and the base station over the wireless radio link. In some cases, the information may be multiplexed such that radio resources of the wireless radio link may be shared by the one or more UEs and the base station. Various multiplexing techniques may be used, such as frequency-division multiplexing (e.g., orthogonal frequency-division multiplexing (OFDM), orthogonal frequency division multiple access (OFDMA), etc.), time-division multiplexing (e.g., time-division multiple access (TDMA)), code-division multiplexing (e.g., code-division multiple access (CDMA)), and/or the like.

BRIEF DESCRIPTION OF THE DRAWINGS

FIG. 7 is a flow chart of an example process for dynamically adjusting subframes.

DETAILED DESCRIPTION OF PREFERRED EMBODIMENTS

Figure 1A:
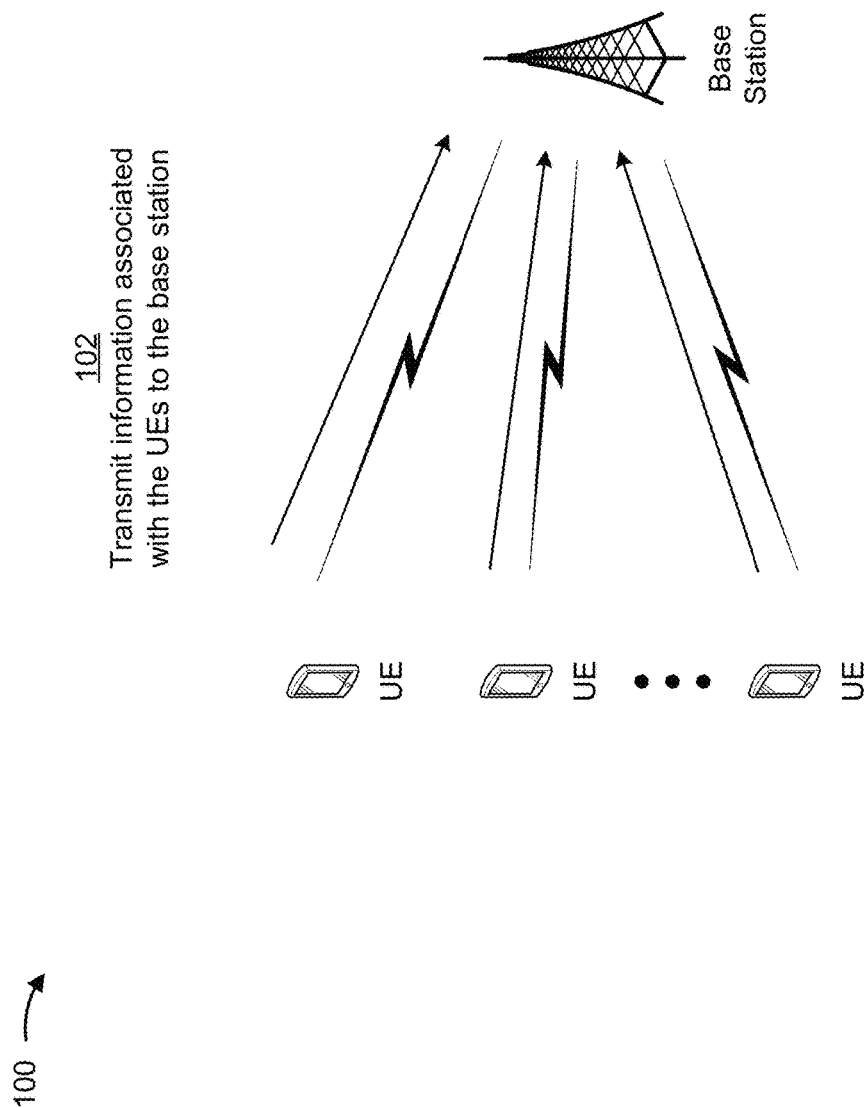
FIGS. 1A and 1B are diagrams of an example implementation described herein.

The following detailed description of example implementations refers to the accompanying drawings. The same reference numbers in different drawings may identify the same or similar elements.

In some cases, the radio resources of a wireless radio link may be divided into one or more frames. For example, a wireless radio link using frequency-division multiplexing (FDM) may be divided into one or more frames, where each frame includes a particular time duration (e.g., 10 ms, 20 ms, etc.) and a particular bandwidth (e.g., 1.4 MHz, 5 MHz, etc.). Each frame may be further divided into a plurality of subframes, where each subframe includes a particular subframe duration (e.g., 1 ms, 0.4 ms, etc.) and subframe bandwidth (e.g., 180 kHz, 200 kHz, etc.). The subframe bandwidth may be further divided into a plurality of subcarriers (e.g., 12 15 kHz subcarriers, 24 7.5 kHz subcarriers, etc.). The plurality of subcarriers may be orthogonal, which reduces crosstalk and reduces the need for guard-banding between subcarriers.

In some cases, the operating conditions in a mobile network may negatively impact the orthogonality of subcarriers of a wireless radio link between a base station and one or more UEs. For example, interference with the wireless radio link, mobility of the one or more UEs, multi-pathing, and/or the like, may cause the orthogonality of the subcarriers to degrade, which in turn can cause an increase in inter-carrier interference (ICI) on the wireless radio link, a decrease in signal to interference plus noise ratio (SINR) on the wireless radio link, and/or the like. Increased ICI and/or decreased SINR can further cause a decrease in accessibility of the one or more UEs, a decrease in throughput on the wireless radio link, and/or the like.

Some implementations described herein provide a device that is capable of adjusting one or more subframe parameters associated with the device. In some implementations, the device may receive information associated with one or more UEs communicatively connected with the device, may generate a score based on the information associated with the one or more UEs, and may adjust, based on the score, one or more subframe parameters associated with the device. In this way, the device may use multiple types of information associated with the one or more UEs, may assign weights to the multiple types of information, and may generate a composite score based on the weighted information. The device may use the score to drive decision making for adjusting and/or optimizing the performance of the device and/or the telecommunications system in which the device is included. Moreover, in this way, the device may dynamically adjust subframes of a wireless radio link, associated with the device, based on operating conditions in a mobile network in which the device and the one or more UEs are located, based on parameters associated with the one or more UEs, and/or the like. Moreover, in this way, the device may preserve and/or increase orthogonality of subcarriers included in one or more subframes of the wireless radio link associated with the device, which increases SINR of the wireless radio link, increases throughput on the wireless radio link, decreases ICI, increases the efficiency of the wireless radio link, and/or the like. In addition, the device may receive feedback based on adjusting the subframes so that the device may measure the improvements to the wireless radio link based on performance indicators such that the device may further refine the adjustments to further increase the performance of the wireless radio link.

Figure 1B:
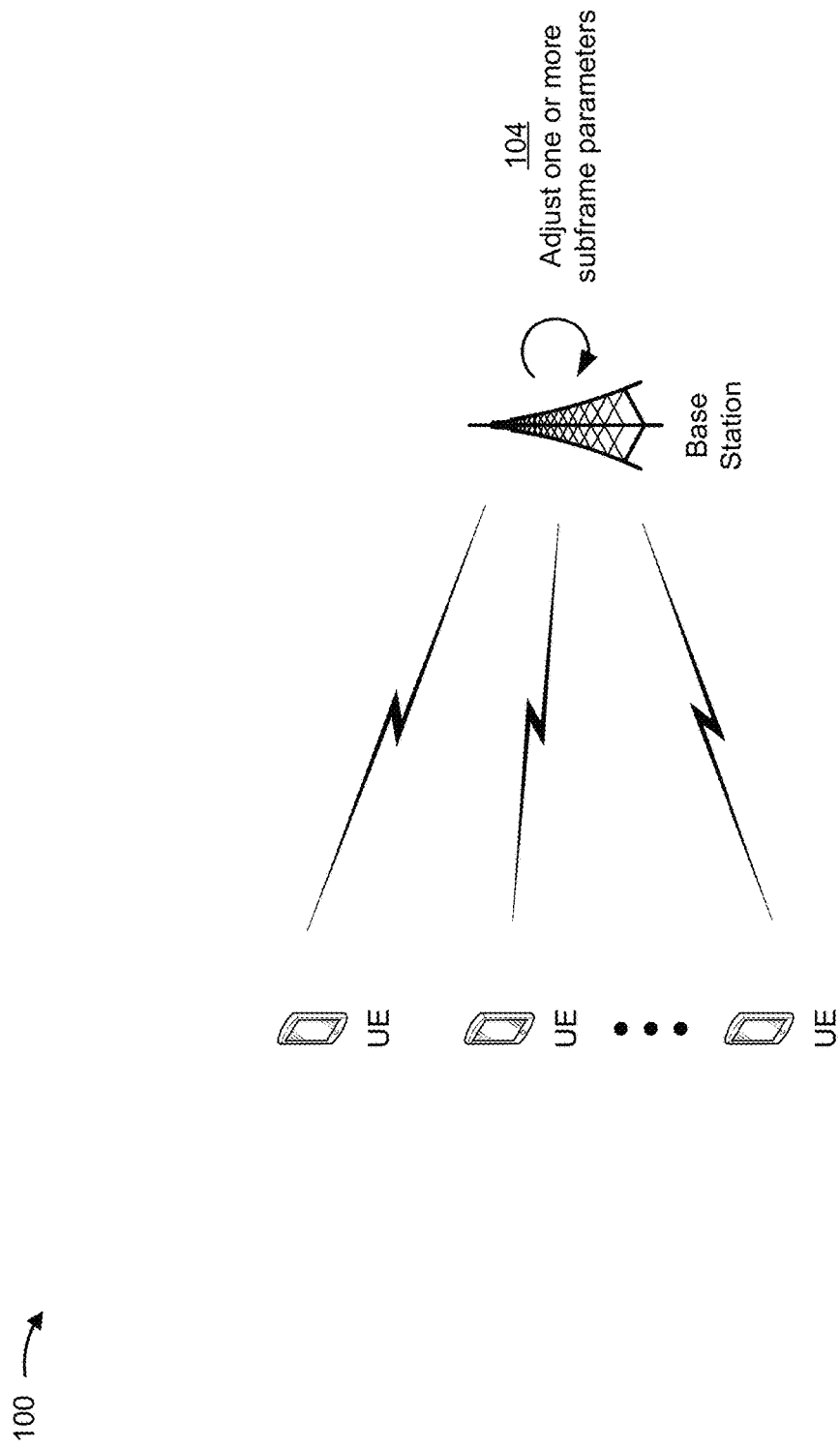

FIGS. 1A and 1B are diagrams of an example implementation 100 described herein. As shown in FIGS. 1A and 1B, implementation 100 may include one or more UEs, a base station, and/or the like. In some implementations, the UEs and the base station may be included in a mobile network. While FIGS. 1A and 1B show three UEs and a base station, more or less UEs and/or additional base stations may be included in implementation 100.

In some implementations, the UEs may be communicatively connected with the base station via a wireless radio link. The wireless radio link may use a type of FDM, such as OFDM, OFDMA, and/or the like, to multiplex wireless communications between the UEs and the base station on the wireless radio link.

Turning to FIG. 1A, and as shown by reference number 102, the UEs may transmit information associated with the UEs to the base station. The UEs may transmit the information at various times, such as at scheduled time intervals, based on an event (e.g., based on a UE connecting to the base station, based on a UE reconnecting to the base station, based on a quantity of dropped packets between the UE and the base station satisfying a threshold quantity of packets, based on a parameter associated with the UE satisfying or not satisfying a threshold, etc.), based on receiving a request from the base station, and/or the like. In some implementations, the UEs may transmit the information to another device, which stores the information in a data store, transmits the information to the base station, and/or the like.

The information associated with a UE may include various types of information. For example, the information associated with a UE may include various types of measurements, such as one or more distance measurements associated with the UE (e.g., information specifying an estimated distance between the UE and the base station, a timing advance (TA) measurement, information identifying a location of the UE such that the base station may estimate the distance between the UE and the base station using the location of the base station and the location of the UE, etc.), one or more signal strength measurements (e.g., a received signal strength indication (RSSI) measurement, a reference signal received power (RSRP) measurement, etc.), one or more channel quality measurements (e.g., a reference signal received quality (RSRQ) measurement, etc.), one or more interference measurements (e.g., a SINR measurement, a signal to noise ratio (SNR) measurement, etc.), and/or the like. As another example, the information associated with a UE may include information identifying one or more service parameters associated with the UE, such as a latency parameter (e.g., a latency parameter associated with an application included on the UE, etc.), a signal quality parameter, a quality of service (QoS) parameter (e.g., a prioritization of the UE on the wireless radio link, a QoS class of the UE, etc.), and/or the like. As a further example, the information associated with the UE may include information identifying one or more events associated with the UE, such as a quantity of inter-frequency handovers of the UE, a quantity of intra-frequency handovers of the UE, a quantity of radio resource connection (RRC) setups associated with the UE, a quantity of RRC reestablishments associated with the UE, and/or the like.

Turning to FIG. 1B, and as shown by reference number 104, the base station may adjust one or more subframe parameters of one or more subframes of the wireless radio link associated with the base station. For example, the base station may adjust a subframe duration of the one or more subframes, may adjust a subcarrier spacing of subcarriers included in the one or more subframes, may adjust a quantity of resource blocks included in the one or more subcarriers, may adjust which subframes are assigned to a particular UE, may adjust a symbol rate associated with the one or more subframes, may adjust a guard interval associated with the one or more subframes, may adjust cyclic prefix values associated with the one or more subframes, and/or the like. In some implementations, the base station may adjust the one or more subframe parameters at the sector carrier level (e.g., may adjust the one or more subframe parameters for a particular sector carrier provided by the base station, may adjust the one or more subframe parameters independently for each sector carrier provided by the base station), may adjust the one or more subframe parameters at the base station level (e.g., may adjust the one or more subframe parameters similarly across all sector carriers provided by the base station), and/or the like.

In some implementations, the base station may adjust (e.g., increase and/or decrease) the subframe duration of the one or more subframes based on the one or more distance measurements received from the one or more UEs. In some cases, the greater the distance a UE is from a base station, the greater the likelihood the UE may experience multipath propagation (e.g., the occurrence of wireless communications reaching a destination by two or more possible paths). Accordingly, the base station may increase and/or decrease the subcarrier duration, may increase and/or decrease the guard interval, may increase and/or decrease the cyclic prefix values, and/or the like, to mitigate the effects of multipath propagation. As an example, the base station may determine an average distance of the one or more UEs (e.g., in kilometers, in miles, and/or the like) based on the one or more distance measurements (e.g., a timing advance measurement, a determination of the distance between the one or more UEs and the base station based on an estimated distance between the location of the base station and the location of the one or more UEs, and/or the like), and may increase and/or decrease the subframe duration based on the average distance satisfying one or more thresholds (e.g., one or more distance thresholds). For example, the base station may increase the subframe duration to a first value based on the base station determining that the average distance satisfies a first threshold (e.g., a first distance threshold, such as 2.5 kilometers, 5 kilometers, 7.5 kilometers, 10 kilometers, and/or the like), may increase the subframe duration to a second value based on the base station determining that the average distance satisfies a second threshold (e.g., a second distance threshold, such as 2.5 kilometers, 5 kilometers, 7.5 kilometers, 10 kilometers, and/or the like), and so on. In some implementations, the first threshold and the second threshold may be the same distance threshold, may be different distance thresholds, and/or the like. As another example, the base station may periodically determine the average distance and increase the subframe duration as the average distance increases and/or decrease the subframe duration as the average distance decreases.

In some implementations, the base station may take into account characteristics of the terrain of the mobile network when increasing and/or decreasing the subframe duration. For example, the greater the variation in elevation of the terrain (thus indicating the presence of hills, mountains, valleys, etc.), the greater the likelihood that a UE will be susceptible to multipath propagation, and thus the base station may determine to adjust the average distance of the one or more UEs based on the variation in the elevation of the terrain, may determine to weight particular distance measurements differently than others, and/or the like.

In some implementations, a UE being located indoors may increase the likelihood the UE experiences multipath propagations. Accordingly, the base station may adjust (e.g., increase and/or decrease) the subframe duration to mitigate multipath propagations based on whether the one or more UEs are indoors and/or outdoors. The base station may estimate whether a UE is indoors or outdoors based on the one or more distance measurements associated with the UE and the one or more signal strength measurements associated with the UE. For example, the UE may determine whether the received signal strength measurement satisfies a signal strength threshold for what the base station expects at a particular distance measurement received from the UE. If the received signal strength measurement does not satisfy the signal strength threshold, the base station may determine that the UE is indoors, and/or may determine that the UE is outdoors if the received signal strength measurement satisfies the signal strength threshold.

In some implementations, the base station may use a percentage threshold of UEs that are indoors, a quantity threshold of UEs that are indoors, and/or any other techniques, such as fuzzy logic, to adjust the subframe duration. For example, the base station may determine a percentage of UEs, of the one or more UEs, that are indoors, and may adjust the subframe duration based on the percentage. To adjust the subframe duration based on the percentage, the base station may increase the subframe duration based on the percentage satisfying one or more thresholds (e.g., 50% of the one or more UEs being indoors, 80% of the one or more UEs being indoors, and/or the like), may decrease the subframe duration based on the percentage not satisfying one or more thresholds, may periodically increase and/or decrease the subframe duration based on changes in the percentage, and/or the like. As another example, the base station may determine the quantity of UEs, of the one or more UEs, may determine whether the quantity of UEs satisfies a threshold quantity of UEs, and may increase the subframe duration based on the quantity satisfying one or more thresholds, may decrease the subframe duration based on the quantity not satisfying one or more thresholds, may periodically increase and/or decrease the subframe duration based on changes in the quantity, and/or the like. In some implementations, the base station may adjust the subframe duration based on a combination of the percentage of UEs that are indoors and the quantity of UEs that are indoors.

In some implementations, the base station may adjust (e.g., increase and/or decrease) the subcarrier spacing of the one or more subcarriers included in the one or more subframes based on the one or more distance measurements received from the one or more UEs. In some implementations, the base station may use the one or more distance measurements associated with a UE to determine the UE's mobility (e.g., speed, velocity, acceleration, etc.), and may increase and/or decrease the subcarrier spacing based on the UE's mobility. For example, the base station may determine the speed of a UE's movement based on a change in the distance measurements received from the UE. The base station may also use other information received from the UE, such as the quantity of inter and/or intra-frequency handovers. In some cases, mobility of the UE may cause phase distortions, frequency offsets, Doppler shifts, and/or the like, on the wireless radio link between the UE and the base station, which in turn can decrease the ability of the UE and/or the base station to successfully decode information included in the one or more subcarriers of the wireless radio link. Accordingly, the base station may increase and/or decrease the subcarrier spacing to mitigate the effects of the phase distortions, frequency shifts, and/or the like.

As an example, the base station may determine an average mobility (e.g., an average speed, an average velocity, an average acceleration, etc.) of the one or more UEs and may increase and/or decrease the subcarrier spacing based on the average distance satisfying one or more thresholds. For example, the base station may increase the subcarrier spacing to a first value based on the base station determining that the average speed satisfies a first threshold, may increase the subcarrier spacing to a second value based on the base station determining that the average speed satisfies a second threshold, and so on. As another example, the base station may periodically determine the average speed and increase the subcarrier spacing as the average speed increases and/or decrease the subcarrier spacing as the average speed decreases. In some implementations, the base station may determine the average mobility based on the one or more distance measurements (e.g., based on changes in the distance measurements over time, based on the rate of changes in the distance measurements over time, and/or the like), may determine the average mobility based on the one or more signal strength measurements e.g., based on changes in the signal strength over time, based on the rate of changes in the signal strength over time, and/or the like), and/or the like. In some implementations, the greater the changes of the distance measurements and/or the signal strength measurements (or the rates) may indicate a greater mobility of the one or more UEs, whereas the lesser the changes of the distance measurements and/or the signal strength measurements (or the rates) may indicate a lesser mobility of the one or more UEs.

In some implementations, the base station may adjust (e.g., increase and/or decrease) the subcarrier spacing based on the one or more signal strength measurements and/or the one or more channel quality measurements associated with the one or more UEs. For example, the base station may determine, based on the one or more signal strength measurements and/or the one or more channel quality measurements, whether interference with the wireless radio link (e.g., narrowband external interference, passive intermodulation, ICI, etc.) satisfies one or more thresholds, and may increase the subcarrier spacing based on determining that the interference satisfies the one or more thresholds, may decrease the subcarrier spacing based on determining that the interference does not satisfy the one or more thresholds, and/or the like.

In some implementations, the base station may adjust the one or more subframe parameters of the one or more subframes of the wireless radio link based on the one more service parameters associated with the one or more UEs by, for example, determining whether a quantity of UEs, of the one or more UEs, having a particular service parameter satisfies a threshold quantity, and adjusting the one or more subframe parameters based on whether the quantity of UEs satisfies the threshold quantity. For example, the base station may determine that a quantity of UEs are transmitting information associated with a particular application, may determine that the particular application has a particular latency parameter, may determine that the quantity of UEs satisfies the threshold quantity, and may increase and/or decrease the subframe duration and/or subcarrier spacing of the one or more subframes to accommodate the particular latency parameters.

In some implementations, the base station may generate a score and may adjust the one or more subframe parameters of the one or more subframes of the wireless radio link associated with the base station based on the score. The score may be a composite score of multiple types of information associated with the one or more UEs, information associated with the mobile network, and/or the like. The base station may generate the score based on, for example, the information associated with the one or more UEs, the average distance of the one or more UEs to the base station, the mobility of the one or more UEs, the percentage of the one or more UEs that are indoors and/or outdoors, the one or more service parameters associated with the one or more UEs, performance indicator data for the mobile network, class of service density measurements based on data volume and/or radio resource control attempts on a given class of service, and/or the like. In some implementations, the base station may weight particular types of information such that particular types of information have more of an influence on the score. In some implementations, the weight for a particular type of information may be determined based on the expected impact the type of information may have on the performance of a wireless radio link between the base station and the one or more UEs, based performance goals for the wireless radio link (e.g., throughput, reliability, and/or the like), based on the base station being configured (e.g., by an operator of the base station) to assign the weight to the particular type of information, and/or the like.

In some implementations, the score (SFS) may be calculated according to equation (1):

$$SFS = (x*Env) + (y*Mob) + (z*I) + (z*L) \quad (1)$$

where x, y, and z are constants, Env includes an environmental factor (e.g., a factor the base station may compute based on a percentage of the one or more UEs that are indoors and the average distance of the one or more UEs), Mob includes a mobility factor (e.g., a factor that the base station may compute based on the mobility of the one or more UEs), I includes an interference factor (e.g., a factor the base station may compute by determining a quantity of interference measurements, associated with the one or more UEs, that satisfy an interference threshold), and L a latency factor (e.g., a factor the base station may compute by determining a quantity of UEs that have a latency parameter that satisfies a threshold).

In some implementations, the environmental factor (Env) may be calculated according to equation (2):

$$Env = a - ((-b - (c*ID) - (c*M))*LN(wD)) + (d - (e*ID)/(f*M))/15 \quad (2)$$

where a, b, and c, d, e, and f are constants, ID is the percentage of the one or more UEs that are indoors, M is the average mobility of the one or more UEs, and wD is the weighted distance of the one or more UEs from the base station. ID may be calculated according to equation (3):

$$ID = count(Indoor)/(count(Indoor) + count(Outdoor)) \quad (3)$$

M may be calculated according to equation (4):

$$M = \left(\left(\frac{endingTA1 - startingTA1}{session\ duration\ 1}\right) + \left(\frac{endingTA2 - startingTA2}{session\ duration\ 1}\right) + \ldots + \left(\frac{endingTAn - startingTAn}{session\ duration\ n}\right)\right)/n \quad (4)$$

where TA is a timing advance measurement and n is the quantity of the one or more UEs. wD may be calculated according to equation (5):

$$wD = (TA1 + TA2 + \ldots + TAn)/n \quad (5)$$

In some implementations, the mobility factor (Mob) may be calculated according to equation (6):

$$Mob = g - (h - (wM*f))/i \quad (6)$$

where g, h, and i are constants, and wM is a weighted version of the average mobility calculated according to equation (4) above.

In some implementations, the interference factor (I) may be calculated according to equation (7):

$$I = count(samples\ above-j\ dBm)/count(total\ samples) \quad (7)$$

where the samples may be interference measurements provided by the one or more UEs (e.g., a SINR measurement, a signal to noise ratio (SNR) measurement, etc.) and j may be a constant dBm.

In some implementations, the latency factor (L) may be calculated according to equation (8):

$$I = \frac{count(RRC\ attempts\ from\ UEs\ with\ a\ latency\ requirement)}{count(RRC\ attempts\ from\ total\ UEs)} \quad (8)$$

In some implementations, the base station may compare the score with a score threshold and may adjust the one or more subframe parameters based on the comparison (e.g., may increase or decrease the subcarrier spacing based on determining that the score satisfies or does not satisfy the score threshold, may increase or decrease the subframe duration based on determining that the score satisfies or does not satisfy the score threshold, and/or the like), may use the score in a cost function to determine a set of one or more subframe parameter adjustments that may optimize the wireless radio link associated with the base station based on operating conditions in the mobile network, and/or the like.

In some implementations, the base station may periodically and/or continuously adjust the one or more subframe parameters associated with the wireless radio link of the base station. For example, the base station may adjust the one or more subframe parameters, as described above, may receive additional information associated with the one or more UEs, may determine whether the adjustments improved the quality of the wireless radio link (e.g., whether the adjustments caused channel quality to satisfy a threshold, whether the adjustments caused multipath propagation to satisfy a threshold, whether the adjustments caused interference to satisfy a threshold, etc.), and may readjust the one or more subframe parameters based on determining that any of the above thresholds are not satisfied.

In this way, the base station may dynamically adjust the one or more subframe parameters of the wireless radio link, associated with the base station, based on operating conditions in the mobile network in which the base station and the one or more UEs are located. This allows the base station to preserve and/or increase orthogonality of subcarriers included in one or more subframes of the wireless radio link associated with the device, which increases channel quality of the wireless radio link, increases throughput on the wireless radio link, increase reliability of the wireless radio link, decreases ICI, increases the efficiency of the wireless radio link, and/or the like. Moreover, this allows the one or more UEs and the base station to transmit packets on the wireless radio link more efficiently on the wireless radio link, which reduces the amount of dropped packets on the wireless radio link, which in turn reduces the quantity of packets that are retransmitted on the wireless radio link.

The number and arrangement of devices shown in FIGS. 1A and 1B are provided as an example. In practice, there may be additional devices, fewer devices, different devices, and/or differently arranged devices than those shown in FIGS. 1A and 1B. Furthermore, two or more devices shown in FIGS. 1A and 1B may be implemented within a single device, or a single device shown in FIGS. 1A and 1B may be implemented as multiple, distributed devices.

As an example, instead of the base station adjusting the one or more subframe parameters, the base station may provide the information associated with the one or more UEs to a self-organizing network (SON) platform and/or another device included in the mobile network, and the SON platform may monitor and order the adjustments. The SON platform may obtain information associated with one or more other UEs that are communicatively connected to one or more other base stations (e.g., where the base station and the one or more other base stations are associated with a particular tracking area code and/or another geographic area identifier), and may adjust one or more subframe parameters for the base station and the one or more other base stations (e.g., by adjusting the one or more subframe parameters in the same way for the base station and the one or more other base stations, by adjusting the one or more subframe parameters differently for the base station and the one or more other base stations, and/or the like). In some implementations, the SON platform may use the information associated with the one or more UEs to adjust groups or clusters of base stations at a time. For example, the SON platform may use the information associated with the one or more UEs to collectively adjust one or more subframe parameters for the base stations in the cluster (e.g., using the same adjustments for the cluster of base stations, using different adjustments for each of the base stations in the cluster, using different adjustments for some base stations and the same adjustments for other base stations in the cluster, and/or the like). In this way, the SON platform may adjust the one or more subframe parameters for the cluster of base stations, such the cluster of base stations may provide the one or more UEs with base stations having a diverse selection of subframe parameters, with base stations having optimized subframe parameters for the operating conditions in the cluster, and/or the like.

FIGS. 2A-2F are diagrams of an example implementation 200 described herein. As shown in FIGS. 2A-2F, implementation 200 may include a plurality of UEs, a plurality of base stations (e.g., cell 1, cell 2, cell 3, etc.) that provide respective coverage areas in a mobile network, and/or the like. Implementation 200 is an example only, and greater and/or fewer UEs and/or base station stations may be included in implementation 200.

In some implementations, the UEs may be communicatively connected with one or more of the base stations via a wireless radio link. In some implementations, the wireless radio link may use a type of FDM, such as OFDM, OFDMA, and/or the like, to multiplex wireless communications between the UEs and the base station on the wireless radio link.

In some implementations, the respective coverage areas of the base stations may at least partially overlap (e.g., the coverage area of cell 1 may partially overlap the coverage area of cell 2, as shown in FIGS. 2A-2F), may fully overlap (e.g., the coverage area of cell 1 may be encompassed by the coverage area of cell 3), may not overlap, and/or the like. A UE may be handed over between base stations having overlapping coverage areas such that the UE does not experience a disruption in service.

In some implementations, the base stations may be included in a particular geographic area assigned to a particular tracking area code and/or another geographic area identifier. In some implementations, the mobile network may be a heterogeneous network such that the base stations are associated with different radio access technologies (RATs), such as a fourth generation (4G) RAT, a long-term evolution (LTE) RAT, a fifth generation (5G) RAT, and/or the like. The base stations associated with different RATs may be referred to as different layers in the mobile network.

Figure 2A:
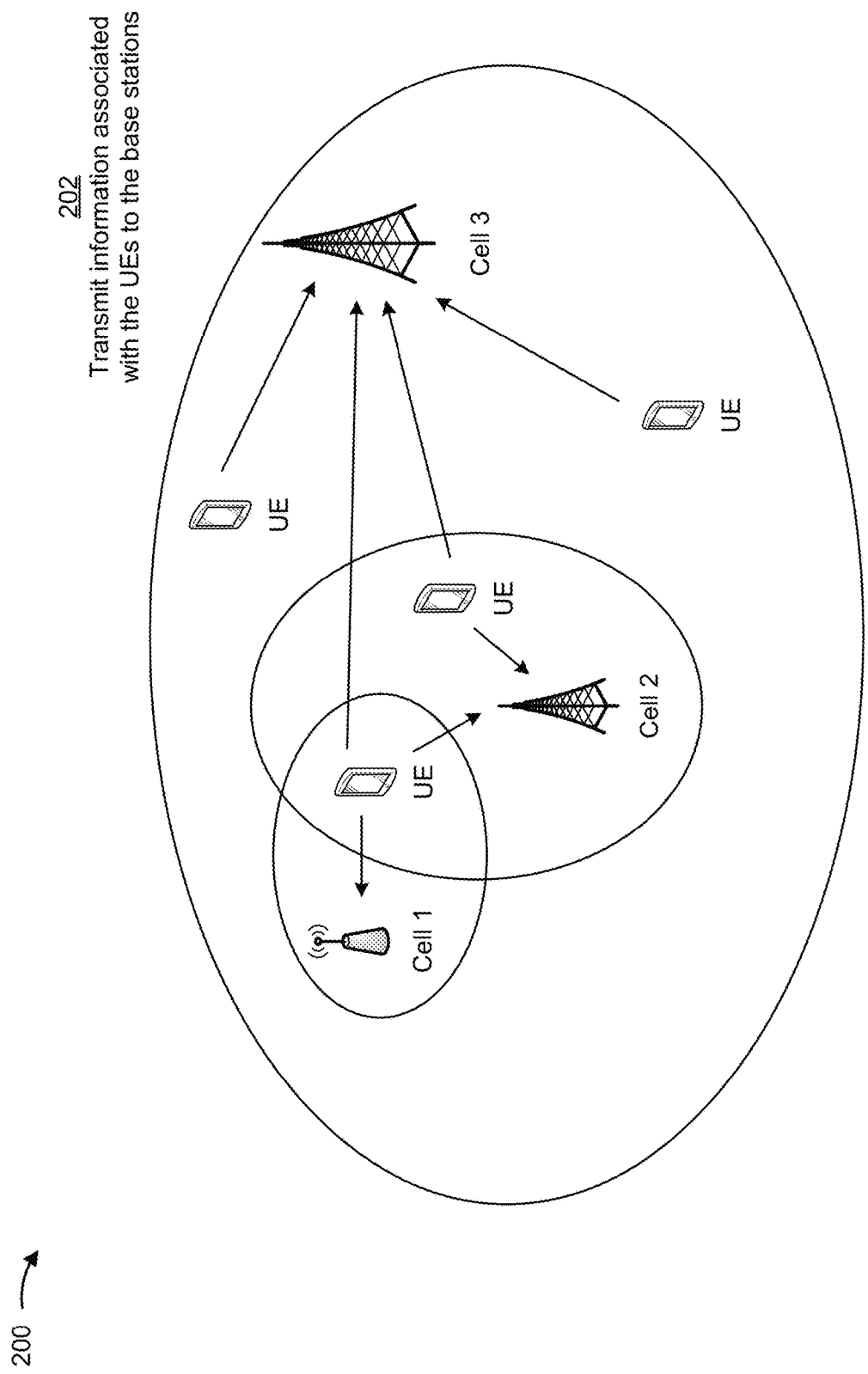
FIGS. 2A-2F are diagrams of an example implementation described herein.

Turning to FIG. 2A, and as shown my reference number 202, the UEs included in the mobile network may transmit information associated with the UEs to one or more of the base stations. For example, and as shown in FIG. 2A, the UE located in the coverage area of small cell 1 may transmit information associated with the UE to cell 1, the UEs located in the coverage area of cell 2 may transmit information associated with the UEs to cell 2, the UEs located in the coverage area of cell 3 may transmit information associated with the UEs to cell 3, and/or the like. The information associated with the UEs may be similar to the information associated with the UEs described above in FIGS. 1A and 1B.

In some implementations, the UEs may transmit the information at various times, such as at scheduled time intervals, based on an event (e.g., based on a UE connecting to a base station, based on a UE reconnecting to a base station, based on a quantity of dropped packets between a UE and the base station satisfying a threshold quantity of packets, based on a parameter associated with a UE satisfying or not satisfying a threshold, etc.), based on receiving a request from a base station, and/or the like. In some implementations, the UEs may transmit the information to another device such as a SON platform, which stores the information in a data store, transmits the information to one or more base stations, and/or the like.

Figure 2B:
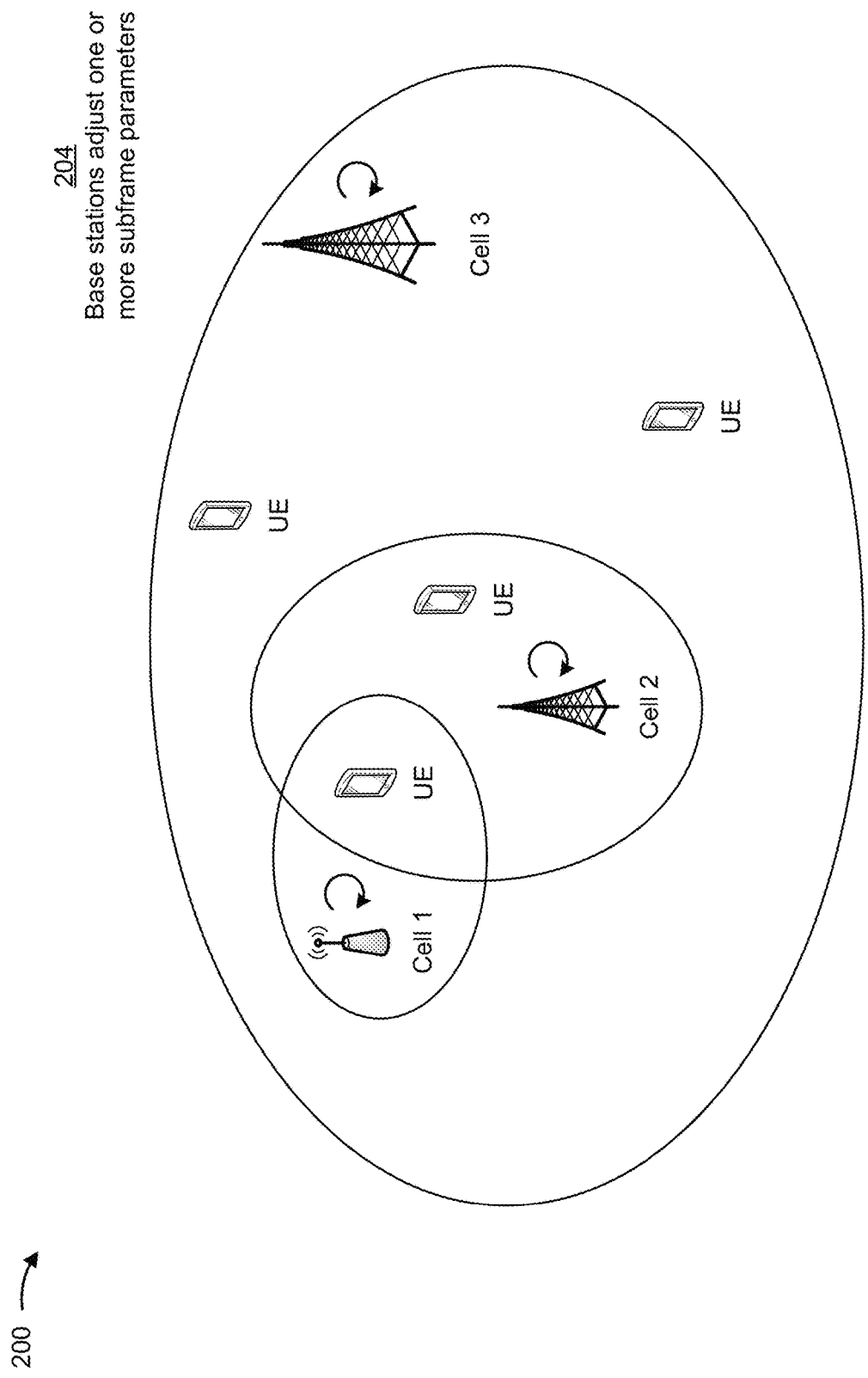

Turning to FIG. 2B, and as shown by reference number 204, the base stations may adjust one or more subframe parameters associated with the base stations. For example, the base stations may adjust any of the subframe parameters described above in FIGS. 1A and 1B, and in a manner similar to those described above in FIGS. 1A and 1B. In some implementations, a base station may adjust the one or more subframe parameters at the sector carrier level (e.g., may adjust the one or more subframe parameters for a particular sector carrier provided by the base station, may adjust the one or more subframe parameters independently for each sector carrier provided by the base station), may adjust the one or more subframe parameters at the base station level (e.g., may adjust the one or more subframe parameters similarly across all sector carriers provided by the base station), and/or the like.

In some implementations, a base station may determine to not adjust one or more subframe parameters associated with the base station based on determining that the one or more subframe parameters associated with the base station are already optimally configured. For example, the base station may determine, based on information received from the UEs, that the one or more parameters associated with the base station are optimally configured for a majority of the UEs, for a threshold percentage of the UEs (e.g., 50%, 80%, and/or the like), and/or the like, and that adjusting the one or more subframe parameters may adversely affect the performance of the wireless radio link. As an example, the base station may determine to not adjust the one or more subframe parameters associated with the base station based on determining that the one or more subframe parameters are already optimally configured for the average distance between the UEs and the base station, for the mobility of the UEs, for the signal strength associated with the UEs, for the one or more service parameters for the UEs, and/or the like.

Figure 2C:
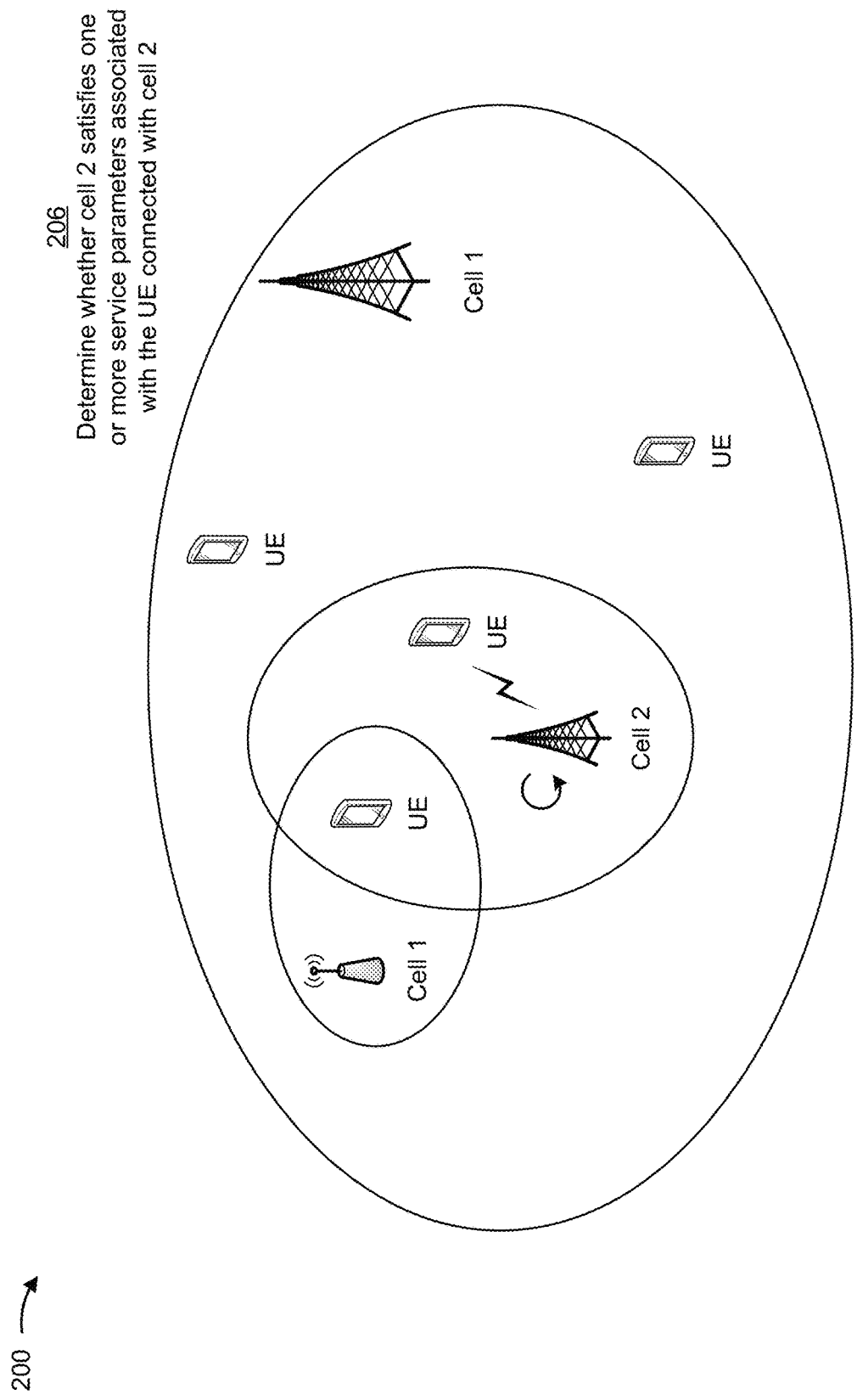

Turning to FIG. 2C, and as shown by reference number 206, a base station (e.g., cell 2) may determine whether the base station is capable of satisfying one or more service parameters associated with a UE communicatively connected with the base station. In some implementations, cell 2 may receive, or have received, information associated with the UE. The information may include information identifying the one or more service parameters associated with the UE (e.g., any of the service parameters identified above in FIGS. 1A and 1B). Cell 2 may determine whether the one or more subframe parameters associated with small cell 2 satisfies the one or more service parameters associated with the UE. For example, the one or more service parameters may include a latency parameter, and cell 2 may determine if cell 2 is capable of satisfying the latency parameters based on the one or more subframe parameters associated with cell 2.

Figure 2D:
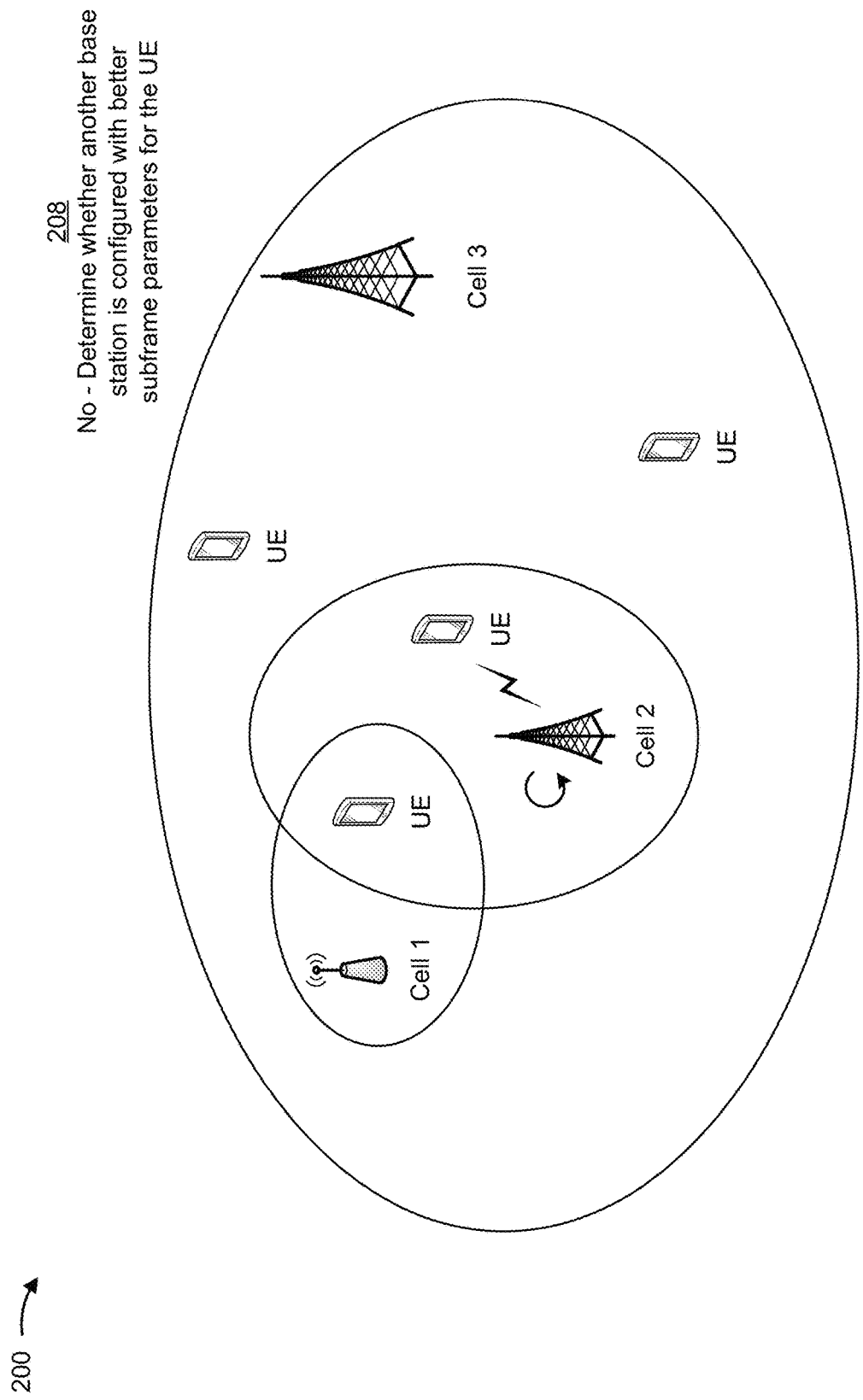

Turning to FIG. 2D, and as shown by reference number 208, if cell 2 determines that cell 2 is not capable of satisfying the latency parameters based on the one or more subframe parameters associated with cell 2, cell 2 may determine whether another base station, included in the geographic area assigned the same geographic area identifier as the base station and capable of serving the UE (e.g., the UE is located in the coverage area of the other base station), is configured with one or more subframe parameters that are capable of satisfying the one or more service parameters associated with the UE.

In some implementations, cell 2 may receive information, associated with the other base stations included in the geographic area assigned the same geographic area identifier as cell 2, from the other base stations. For example, cell 2 may receive the information associated with the other base stations on a wired and/or wireless side-haul link between cell 2 and the other base stations, from the SON platform, from the UE, from another device included in the mobile network, and/or the like.

The information associated with a particular base station, of the other base stations, may include information identifying one or more subframe parameters associated with the base station. Accordingly, cell 2 may receive the information associated with the base station, may identify the one or more subframe parameters, associated with the base station, included in the information associated with the base station, and may determine whether the one or more subframe parameters associated with the base station satisfy the one or more service parameters associated with the UE.

Figure 2E:
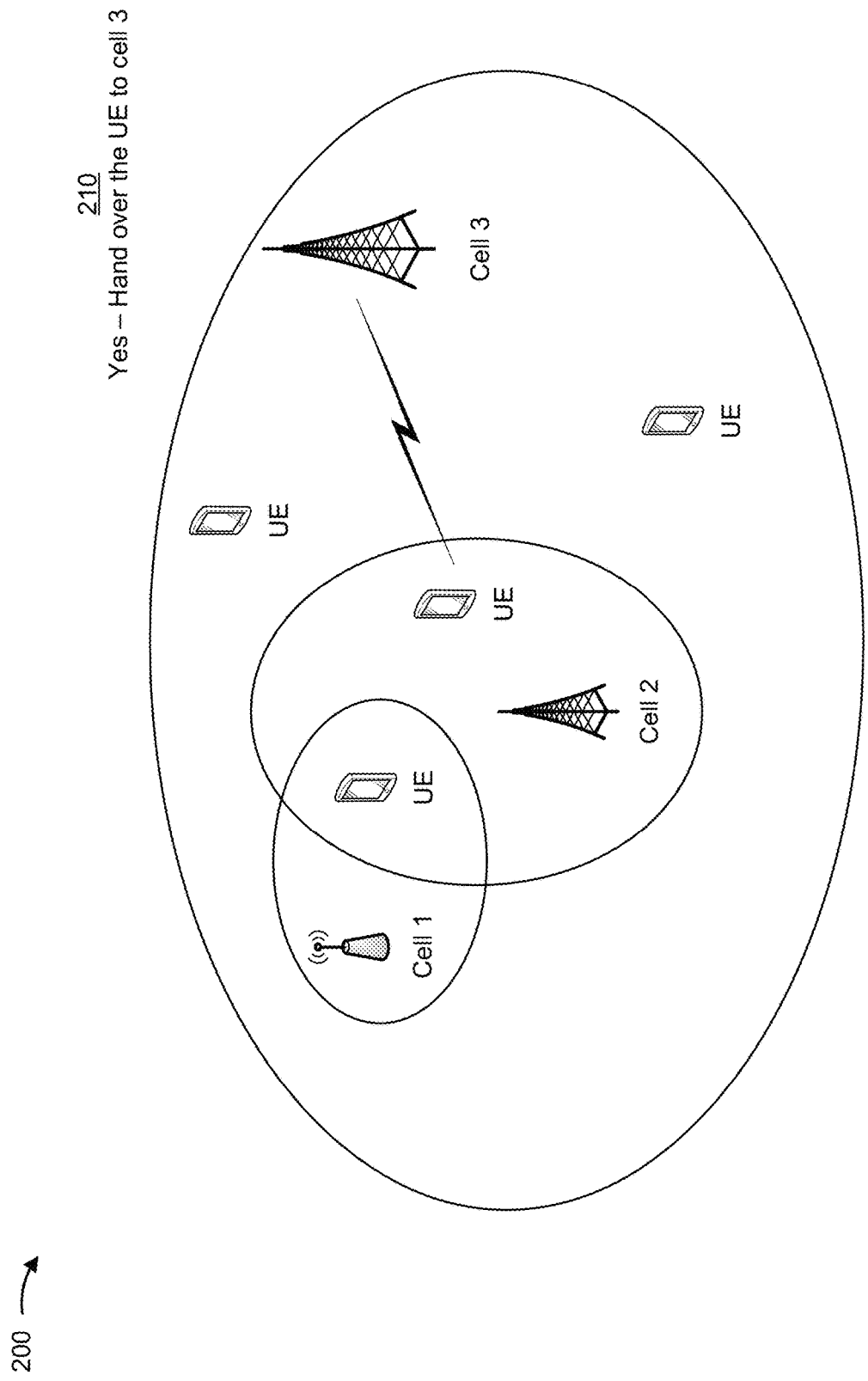

Turning to FIG. 2E, and as shown by reference number 210, cell 2 may determine that another base station (e.g., cell 3) is capable of satisfying the one or more service parameters of the UE, and is capable of serving the UE, may accordingly hand over the UE to the other base station. In this way, the UE is served by a base station that is configured with better subframe parameters to serve the UE and satisfy the UE's one or more service parameters. This provides the UE with increased quality of service and simplifies the operation of the mobile network since cell 2 does not need to readjust the one or more subframe parameters associated with cell 2 to satisfy the one or more service parameters associated with the UE, which in turn conserves network resources, processing resources, and/or memory resources associated with small cell 2 and/or the UE that would have otherwise been used to readjust the one or more subframe parameters associated with cell 2.

In some implementations, cell 2 may determine that another frequency band provided by cell 2 is capable of satisfying the one or more service parameters of the UE, and is capable of serving the UE, may accordingly hand over the UE to the other frequency band. For example, cell 2 may propagate multiple frequency bands (e.g. 700 MHz, 2100 MHz, etc.), and a first carrier/frequency band (e.g., 2100 MHz) may be configured with one subframe structure that is suited for certain users (e.g. users that are close to the base station, users that require very fast latency, etc.), and a second frequency band, (e.g., 700 MHz) may be configured with a subframe structure that is suited for other users (e.g. users that are far from the base station and may be more susceptible to multipath, etc.). If cell 2 determines that a given UE is far away from the base station and is currently connected to the 2100 MHz), instead of changing the subframe structure of the first frequency band, cell 2 may hand over the UE to the second frequency band. In this way, the UE is served by a carrier/frequency band that is configured with better subframe parameters to serve the UE and satisfy the UE's one or more service parameters. This provides the UE with increased quality of service while still using the same cell (e.g., cell 2).

Figure 2F:
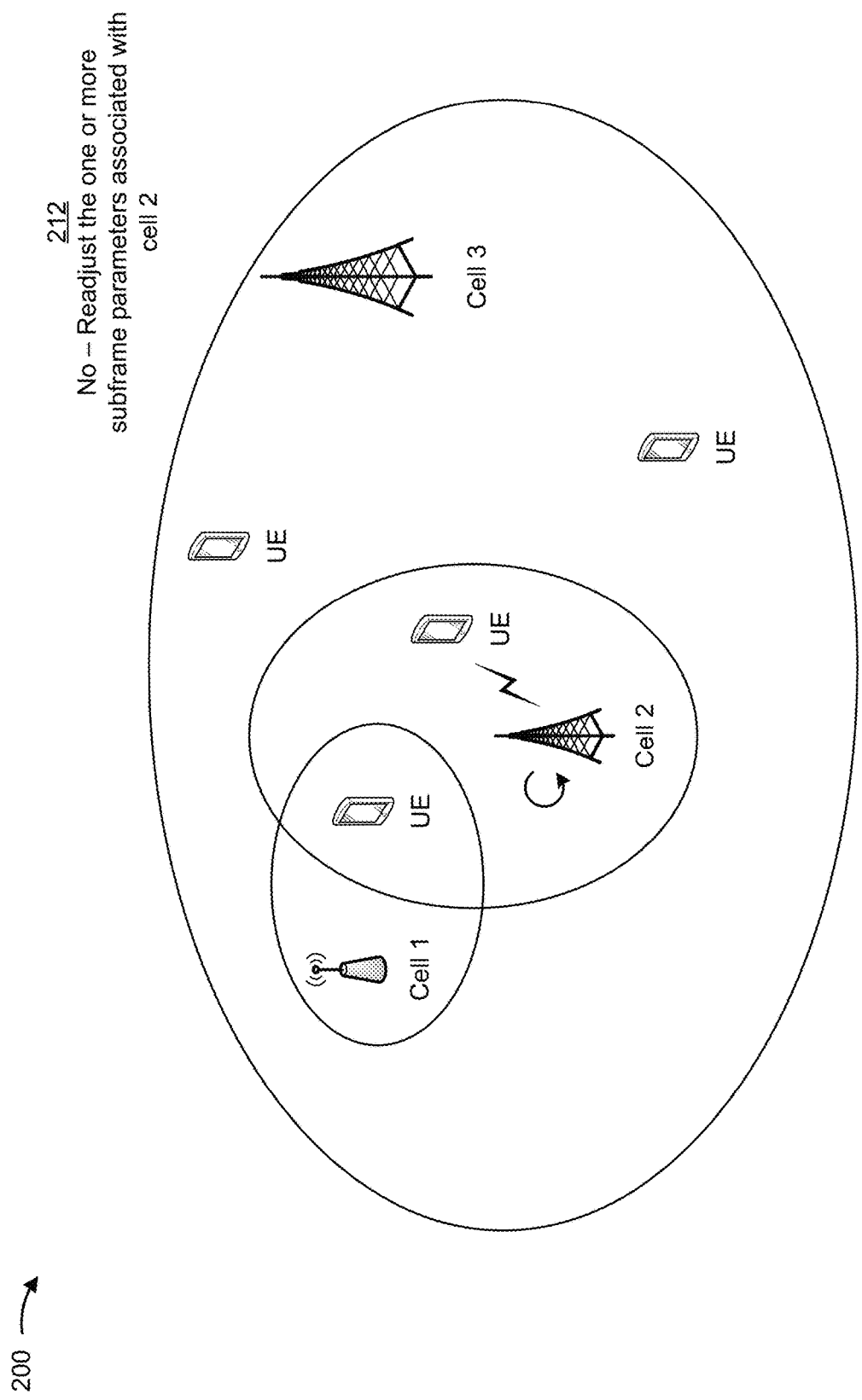

Turning to FIG. 2F, and as shown by reference number 212, cell 2 may determine that there is no other base station capable of serving the UE, included in the geographic area assigned the same geographic area identifier as cell 2, and may accordingly readjust the one or more subframe parameters associated with cell 2 to satisfy the one or more service parameters associated with the UE. In some implementations, cell 2 may determine whether there are other UEs, communicatively connected with cell 2, that have the same and/or similar service parameters as the UE, and may determine whether the quantity of the other UEs satisfies a threshold. If cell 2 determines that the quantity of the other UEs satisfies the threshold, the UE may determine to readjust the one or more subframe parameters associated with cell 2. If cell 2 determines that the quantity of the other UEs does not satisfy the threshold, the UE may determine to not readjust the one or more subframe parameters associated with cell 2. In this way, cell 2 may readjust the one or more subframe parameters associated with cell 2 when there is a large quantity (e.g., thousands, tens of thousands, etc.) of other UEs with the same and/or similar service parameters as the UE, and may determine to not readjust the one or more subframe parameters associated with cell 2 when there is not a large quantity of other UEs with the same and/or similar service parameters as the UE, which conserves network resources, processing resources, and/or memory resources associated with cell 2, associated with the UE, and/or associated with the other UEs, that would have otherwise been used to readjust the one or more subframe parameters associated with cell 2 if there is not a significant number of UEs with the same and/or similar service parameters as the UE.

The number and arrangement of devices shown in FIGS. 2A-2F are provided as an example. In practice, there may be additional devices, fewer devices, different devices, and/or differently arranged devices than those shown in FIGS. 2A-2F. Furthermore, two or more devices shown in FIGS. 2A-2F may be implemented within a single device, or a single device shown in FIGS. 2A-2F may be implemented as multiple, distributed devices.

As an example, instead of the base stations adjusting the one or more subframe parameters associated with the base stations, the base stations may provide the information associated with the one or more UEs to the SON platform and/or another device included in the mobile network, and the SON platform may perform the adjustments. Moreover, the SON platform may determine whether to hand over a particular UE from one base station to another, whether to readjust one or more subframe parameters associated with a particular base station to satisfy one or more service parameters associated with the UE, and/or the like.

Figure 3:
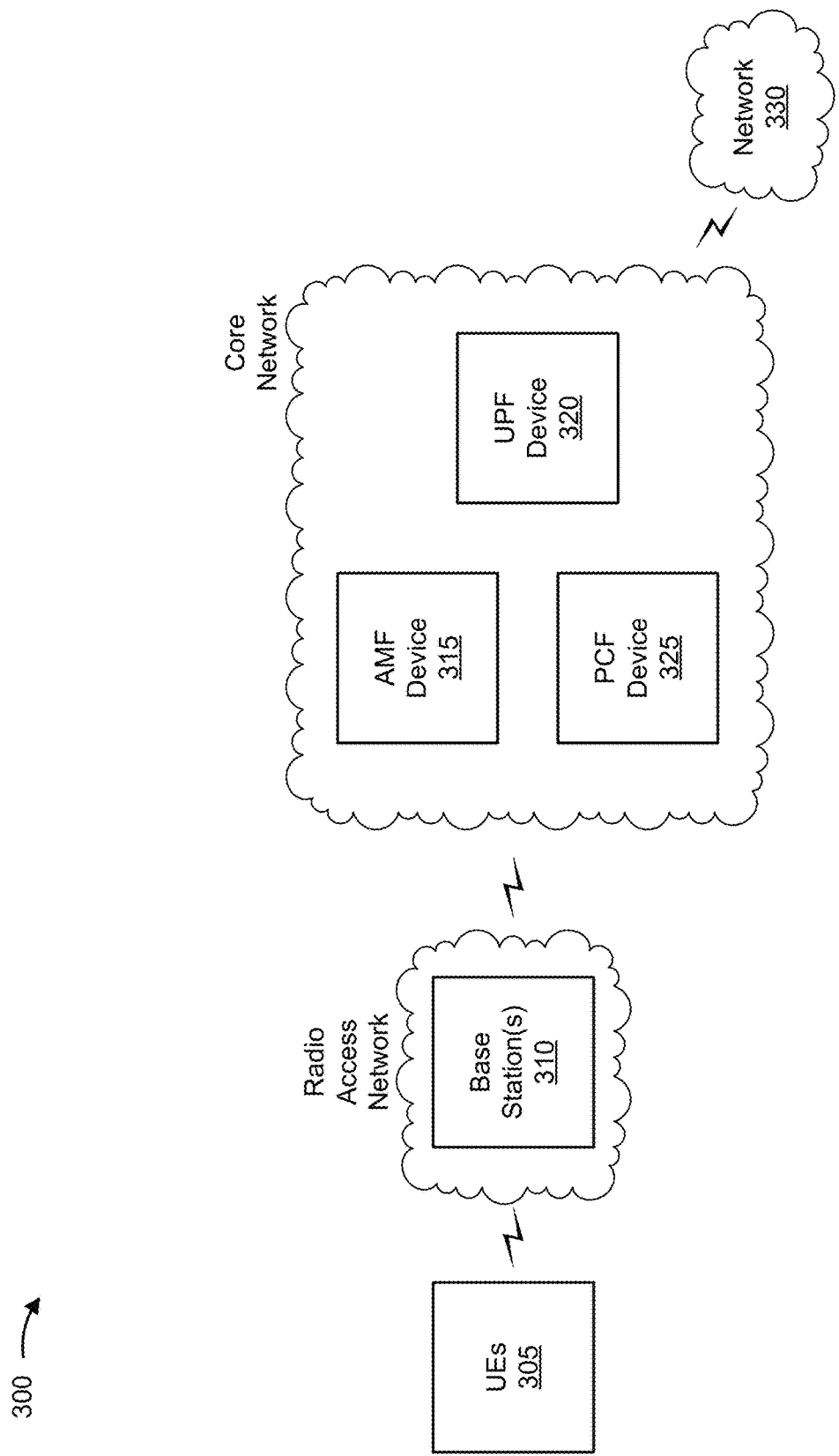
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include one or more UEs 305, one or more base stations 310, an access and mobility management function (AMF) device 315, a user plane function (UPF) device 320, a policy control function (PCF) device 325, a network 330, and/or the like. Devices of environment 300 may interconnect via wired connections, wireless connections, or a combination of wired and wireless connections.

Some implementations may be performed within a 5G network, a 3G network, a 4G network, a long-term evolution (LTE) network, and/or the like.

Environment 300 may include a radio access network (RAN), such as a 5G next generation RAN (NG-RAN, a 3G universal mobile telecommunications system (UMTS) RAN (UTRAN), a LTE evolved UTRAN (E-UTRAN), and/or the like. The RAN may include one or more base stations 310 via which UE 305 communicates with the core network. The core network may include a 5G next generation core network (NG Core), a LTE evolved packet core (EPC), and/or the like. The core network may include AMF device 315, UPF device 320, and/or PCF device 325 that enable UE 305 to communicate with network 330.

UE 305 includes one or more devices capable of communicating with base station 310 and/or a network (e.g., network 330). For example, UE 305 may include a wireless communication device, an IoT device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 305 may send traffic to and/or receive traffic from network 330 (e.g., via base station 310, UPF device 320, and/or the like). In some implementations, UE 305 may transmit information associated with UE 305 (e.g., based on a scheduled time interval, based on an event, based on receiving a request from the base station, and/or the like), to base station 310, to another device that stores the information in a data store and transmits the information to base station 310, and/or the like.

Base station 310 includes one or more devices capable of transferring traffic, such as audio, video, text, data and/or other traffic, destined for and/or received from UE 305. In some implementations, base station 310 may receive traffic from and/or sends traffic to network 330 via UPF device 320 and/or the like. Base station 310 may send traffic to and/or receive traffic from UE 305 via an air interface. In some implementations, base station 310 may include one or more small cell base stations, such as a base station of a microcell, a picocell, and/or a femtocell; one or more macrocell base stations, such as a NodeB, an eNodeB, a gNodeB, and/or the like. In some implementations, base station 310 may adjust one or more subframe parameters (e.g., a subframe duration of the one or more subframes, a subcarrier spacing of subcarriers included in the one or more subframes, a quantity of resource blocks included in the one or more subcarriers, which subframes are assigned to a particular UE, a symbol rate associated with the one or more subframes, a guard interval associated with the one or more subframes, cyclic prefix values associated with the one or more subframes, and/or the like) of one or more subframes of a wireless radio link associated with base station 310.

In some implementations, base station 310 (e.g., a small cell) may determine whether base station 310 is capable of satisfying one or more service parameters associated with a UE 305 communicatively connected with base station 310 and, if base station 310 is not capable of satisfying the one or more service parameters, may determine whether another base station is configured with better subframe parameters for UE 305. In some implementations, if base station 310 determines that another base station is configured with better subframe parameters for UE 305, base station 310 may hand over UE 305 to another base station 310 (e.g., a macrocell).

AMF device 315 includes one or more devices, such as one or more server devices, one or more virtualized devices, one or more cloud-computing devices, and/or the like, capable of managing authentication, activation, deactivation, and/or mobility functions associated with UE 305. In some implementations, AMF device 315 may be a mobility management entity (MME) device. In some implementations, AMF device 315 may perform operations relating to authentication of UE 305. Additionally, or alternatively, AMF device 315 may facilitate the selection of a particular UPF device 320 to serve traffic to and/or from UE 305. AMF device 315 may perform operations associated with handover of UE 305 from a first base station 310 to a second base station 310 when UE 305 transitions from a first cell associated with the first base station 310 to a second cell associated with the second base station 310. Additionally, or alternatively, AMF device 315 may select another AMF device (not pictured), to which UE 305 should be handed off (e.g., when UE 305 moves out of range of AMF device 315).

UPF device 320 includes one or more devices capable of providing connectivity for UE 305 to external packet data networks (e.g., other than the depicted core network). For example, UPF device 320 may include one or more data processing and/or traffic transfer devices, such as a cloud-computing device, a virtual device, a router, a modem, a switch, a firewall, a network interface card (NIC), a hub, a bridge, a server device, an optical add-drop multiplexer (OADM), a packet data network gateway (PGW), a serving gateway (SGW), and/or any other type of device that processes and/or transfers traffic.

PCF device 325 includes one or more devices, such as one or more server devices, one or more virtualized devices, one or more cloud-computing devices, and/or the like, capable of generating, maintaining, and distributing policy rules. In some implementations, PCF device 325 may include a policy control and rules function (PCRF) device. In some implementations, PCF device 325 may generate, store, and/or provide policy rules (e.g., a traffic steering rule, a usage reporting rule, a packet inspection rule, a QoS rule, a charging rule, etc.). For example, PCF device 325 may provide one or more policy rules to UPF device 320 so that the UPF device may apply the one or more policy rules.

Network 330 includes one or more wired and/or wireless networks. For example, network 330 may include a telecommunications network (e.g., a 5G network, a LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
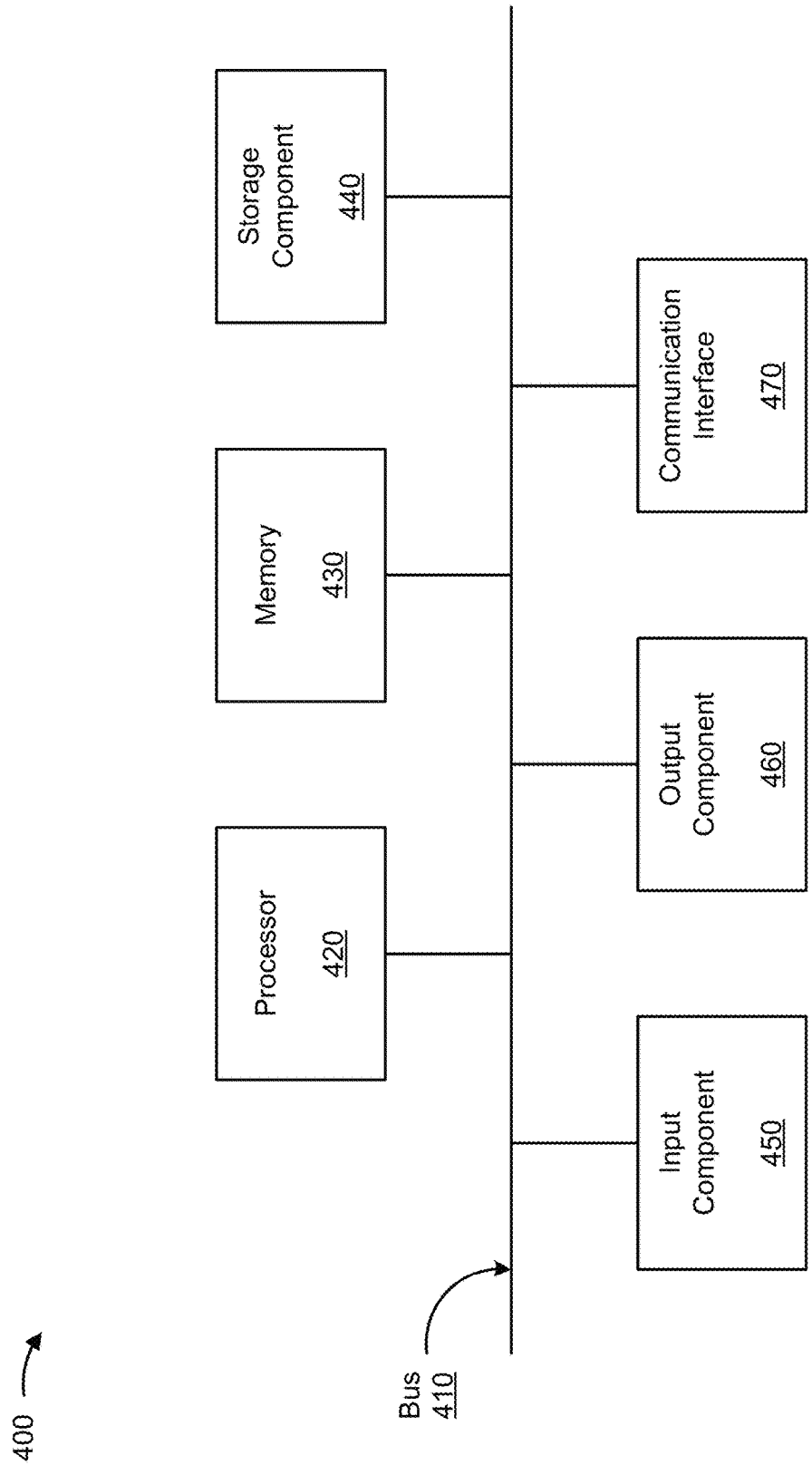
FIG. 4 is a diagram of example components of one or more devices of FIG. 3.

FIG. 4 is a diagram of example components of a device 400. Device 400 may correspond UE 305, base station 310, AMF device 315, UPF device 320, PCF device 325, one or more devices included in network 330, and/or the like. In some implementations UE 305, base station 310, AMF device 315, UPF device 320, PCF device 325, one or more devices included in network 330, and/or the like, may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
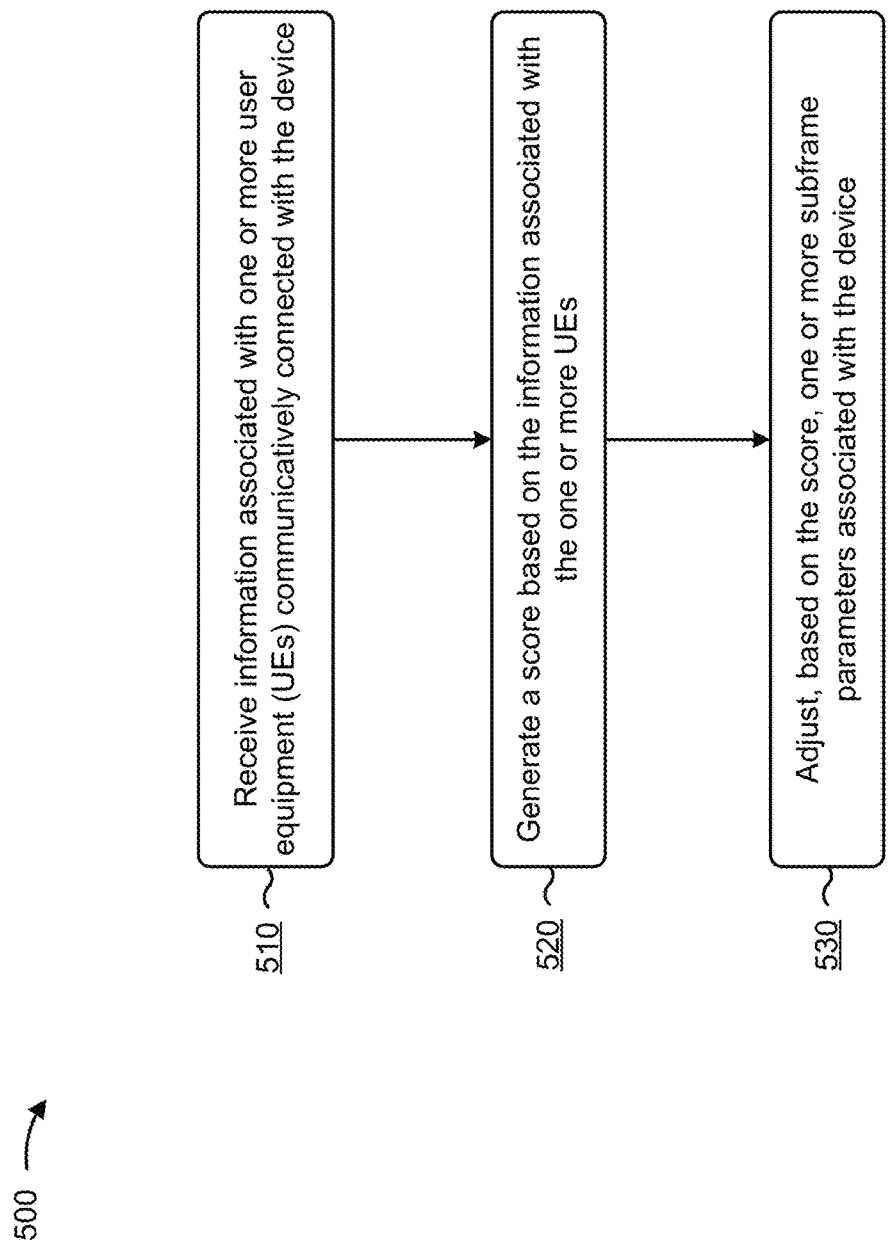
FIG. 5 is a flow chart of an example process for dynamically adjusting subframes.

FIG. 5 is a flow chart of an example process 500 for dynamically adjusting subframes. In some implementations, one or more process blocks of FIG. 5 may be performed by a base station (e.g., base station 310). In some implementations, one or more process blocks of FIG. 5 may be performed by another device or a group of devices separate from or including the base station, such as a UE (e.g., UE 305), another base station (e.g., another base station 310), an AMF device (e.g., AMF device 315), a UPF device (e.g., UPF device 320), a PCF device (e.g., PCF device 325), and/or the like.

As shown in FIG. 5, process 500 may include receiving information associated with one or more user equipments (UEs) communicatively connected with the device (block 510). For example, the base station (e.g., using processor 420, memory 430, storage component 440, input component 450, communication interface 470, and/or the like) may receive information associated with one or UEs communicatively connected with the device, as described above in connection with FIGS. 1A-2F. In some implementations, the information associated with the one or more UEs may include one or more distance measurements associated with the one or more UEs, one or more interference measurements associated with the one or more UEs, a quantity of inter-frequency handovers associated with the one or more UEs, a quantity of intra-frequency handovers associated with the one or more UEs, one or more service parameters associated with the one or more UEs, one or more signal strength measurements associated with the one or more UEs, one or more channel quality measurements associated with the one or more UEs, one or more latency parameters associated with the one or more UEs, and/or the like.

As further shown in FIG. 5, process 500 may include generate a score based on the information associated with the one or more UEs (block 520). For example, the base station (e.g., using processor 420, memory 430, storage component 440, and/or the like) may generate a score based on the information associated with the one or more UEs, as described above in connection with FIGS. 1A-2F. In some implementations, the base station may generate the score based on multiple pieces of information from the information associated with the one or more UEs described above. In some implementations, the base station may weight particular types of information such that particular types of information have more of an influence on the score. In some implementations, the weight for a particular type of information may be determined based on the expected impact the type of information may have on the performance of a wireless radio link between the base station and the one or more UEs, based performance goals for the wireless radio link (e.g., throughput, reliability, and/or the like), based on the base station being configured (e.g., by an operator of the base station) to assign the weight to the particular type of information, and/or the like.

As further shown in FIG. 5, process 500 may include adjusting, based on the score, one or more subframe parameters associated with the device (block 530). For example, the base station (e.g., using processor 420, memory 430, storage component 440, and/or the like) may adjust, based on the score, one or more subframe parameters associated with the device, as described above in connection with FIGS. 1A-2F. In some implementations, the base station may determine the adjustments by determining an average distance between the base station and the one or more UEs, and may adjust the subframe duration and/or the subcarrier spacing based on the average distance. In some implementations, the base station may determine the adjustments by determining an average mobility of the one or more UEs, and may adjust the subframe duration and/or the subcarrier spacing based on the average mobility. In some implementations, the base station may determine the adjustments by determining a percentage of the one or more UEs that are indoors, and may adjust the subframe duration and/or the subcarrier spacing based on the percentage.

Process 500 may include additional implementations, such as any single implementation or any combination of implementations described below and/or in connection with one or more other processes described elsewhere herein.

In some implementations, the one or more subframe parameters may include a subframe duration of a wireless radio link between the device or the one or more UEs, and/or a subcarrier spacing of the wireless radio link between the device or the one or more UEs. In some implementations, the base station may determine one or more service parameters associated with a UE of the one or more UEs, may determine whether the one or more subframe parameters, associated with the device, satisfy the one or more service parameters, may determine, based on determining that the one or more subframe parameters do not satisfy the one or more service parameters, whether one or more other subframe parameters, associated with another device, satisfy the one or more service parameters, and may initiate a handover of the UE to the other device based on determining that the one or more other subframe parameters, associated with the other device, satisfy the one or more service parameters.

In some implementations, the base station may determine one or more service parameters associated with a UE of the one or more UEs, may determine whether the one or more subframe parameters, associated with the device, satisfy the one or more service parameters, may determine, based on determining that the one or more subframe parameters do not satisfy the one or more service parameters, whether one or more other subframe parameters, associated with another device, satisfy the one or more service parameters, and may readjust the one or more subframe parameters based on determining that the one or more other subframe parameters, associated with the other device, do not satisfy the one or more service parameters.

In some implementations, the information associated with the one or more UEs may include one or more distance measurements associated with the one or more UEs and, when generating the score, the base station may determine, based on the one or more distance measurements, an average distance between the device and the one or more UEs, and, when adjusting the one or more subframe parameters associated with the device, the base station may adjust, based on the average distance between the device and the one or more UEs, a subframe duration of a wireless radio link between the device and the one or more UEs.

In some implementations, when generating the score, the base station may determine, based on the information associated with the one or more UEs, a percentage of the one or more UEs that are indoors, and when adjusting the one or more subframe parameters associated with the device, the base station may adjust the one or more subframe parameters based on whether the percentage of the one or more UEs that are indoors satisfies a threshold. In some implementations, when generating the score, the base station may determine an average mobility for the one or more UEs, and when adjusting the one or more subframe parameters associated with the device, the base station may adjust the one or more subframe parameters based on the average mobility of the one or more UEs (e.g., based on changes in the distance measurements over time, based on changes in the signal strength measurements over time, and/or the like).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
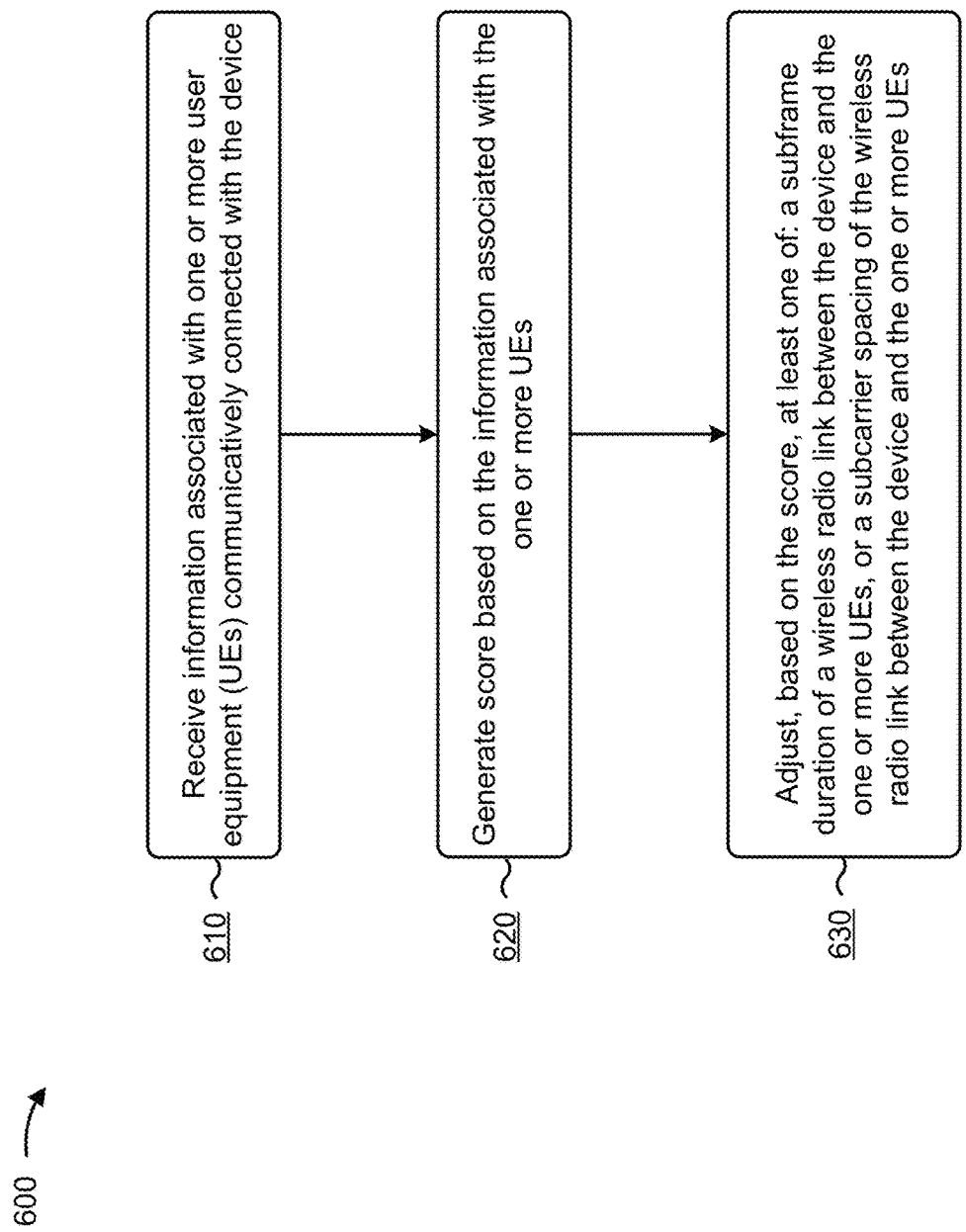
FIG. 6 is a flow chart of an example process for dynamically adjusting subframes.

FIG. 6 is a flow chart of an example process 600 for dynamically adjusting subframes. In some implementations, one or more process blocks of FIG. 6 may be performed by a base station (e.g., base station 310). In some implementations, one or more process blocks of FIG. 6 may be performed by another device or a group of devices separate from or including the base station, such as a UE (e.g., UE 305), another base station (e.g., another base station 310), an AMF device (e.g., AMF device 315), a UPF device (e.g., UPF device 320), a PCF device (e.g., PCF device 325), and/or the like.

As shown in FIG. 6, process 600 may include receiving information associated with one or more pieces or types of user equipment communicatively connected with the device (block 610). For example, the base station (e.g., using processor 420, memory 430, storage component 440, input component 450, communication interface 470, and/or the like) may receive information associated with one or more UEs communicatively connected with the device, as described above in connection with FIGS. 1A-2F. In some implementations, the information associated with the one or more UEs may include one or more distance measurements associated with the one or more UEs, one or more interference measurements associated with the one or more UEs, a quantity of inter-frequency handovers associated with the one or more UEs, a quantity of intra-frequency handovers associated with the one or more UEs, one or more service parameters associated with the one or more UEs, one or more signal strength measurements associated with the one or more UEs, one or more channel quality measurements associated with the one or more UEs, one or more latency parameters associated with the one or more UEs, and/or the like.

As further shown in FIG. 6, process 600 may include generating a score based on the information associated with the one or more UEs (block 620). For example, the base station (e.g., using processor 420, memory 430, storage component 440, and/or the like) may generate a score based on the information associated with the one or more, as described above in connection with FIGS. 1A-2F. In some implementations, the base station may generate the score based on multiple pieces of information from the information associated with the one or more UEs described above. In some implementations, the base station may weight particular types of information such that particular types of information have more of an influence on the score. In some implementations, the weight for a particular type of information may be determined based on the expected impact the type of information may have on the performance of a wireless radio link between the base station and the one or more UEs, based performance goals for the wireless radio link (e.g., throughput, reliability, and/or the like), based on the base station being configured (e.g., by an operator of the base station) to assign the weight to the particular type of information, and/or the like.

As further shown in FIG. 6, process 600 may include adjusting, based on the score, a subframe duration of a wireless radio link between the device and the one or more UEs, and/or a subcarrier spacing of the wireless radio link between the device and the one or more UEs (block 630). For example, the base station (e.g., using processor 420, memory 430, storage component 440, and/or the like) may adjust, based on the score, a subframe duration of a wireless radio link between the device and the one or more UEs, and/or a subcarrier spacing of the wireless radio link between the device and the one or more UEs, as described above in connection with FIGS. 1A-2F. In some implementations, the base station may determine the adjustments by determining an average distance between the base station and the one or more UEs, and may adjust the subframe duration and/or the subcarrier spacing based on the average distance. In some implementations, the base station may determine the adjustments by determining an average mobility of the one or more UEs (e.g., based on changes in the distance measurements over time, based on changes in the signal strength measurements over time, and/or the like), and may adjust the subframe duration and/or the subcarrier spacing based on the average mobility. In some implementations, the base station may determine the adjustments by determining a percentage of the one or more UEs that are indoors, and may adjust the subframe duration and/or the subcarrier spacing based on the percentage.

Process 600 may include additional implementations, such as any single implementation or any combination of implementations described below and/or in connection with one or more other processes described elsewhere herein.

In some implementations, the information associated with the one or more UEs may include one or more signal strength measurements associated with the one or more UEs, one or more channel quality measurements associated with the one or more UEs, and/or one or more latency parameters associated with the one or more UEs.

In some implementations, the information associated with the one or more UEs may include one or more distance measurements associated with the one or more UEs and, when generating the score, the base station may determine, based on the one or more distance measurements, an average distance between the device and the one or more UEs, may determine whether the average distance between the device and the one or more UEs satisfies a threshold, and, when adjusting the subframe duration, the base station may adjust the subframe duration based on determining whether the average distance between the device and the one or more UEs satisfies the threshold.

In some implementations, the information associated with the one or more UEs may include one or more distance measurements associated with the one or more UEs and, when generating the score, the base station may determine, based on the one or more distance measurements, an average speed of movement of the one or more UEs, may determine whether the average speed of movement of the one or more UEs satisfies a threshold, and, when adjusting the subcarrier spacing, the base station may adjust the subcarrier spacing based on determining whether the average speed of movement of the one or more UEs satisfies the threshold.

In some implementations, the information associated with the one or more UEs may include one or more distance measurements associated with the one or more UEs, and one or more signal strength measurements associated with the one or more UEs, and, when generating the score, the base station may determine, based on the one or more distance measurements and the one or more signal strength measurements, a percentage of the one or more UEs that are indoors, may determine whether the percentage of the one or more UEs that are indoors satisfies a threshold, and, when adjusting the subframe duration, the base station may adjust the subframe duration based on determining whether the percentage of the one or more UEs that are indoors satisfies the threshold.

In some implementations, the information associated with the one or more UEs may include one or more interference measurements associated with the one or more UEs and, when generating the score, the base station may determine whether the one or more interference measurements associated with the one or more UEs satisfies a threshold, and, when adjusting the subcarrier spacing, the base station may increase the subcarrier spacing based on determining that the one or more interference measurements associated with the one or more UEs satisfies the threshold or decrease the subcarrier spacing based on determining that the one or more interference measurements associated with the one or more UEs does not satisfy the threshold.

In some implementations, when generating the score, the base station may generate the score based on at least one of one or more distance measurements associated with the one or more UEs, one or more interference measurements associated with the one or more UEs, one or more signal strength measurements associated with the one or more UEs, one or more interference measurements associated with the one or more UEs, and/or one or more latency parameters associated with the one or more UEs.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for dynamically adjusting subframes. In some implementations, one or more process blocks of FIG. 7 may be performed by a base station (e.g., base station 310). In some implementations, one or more process blocks of FIG. 7 may be performed by another device or a group of devices separate from or including the base station, such as a UE (e.g., UE 305), another base station (e.g., another base station 310), an AMF device (e.g., AMF device 315), a UPF device (e.g., UPF device 320), a PCF device (e.g., PCF device 325), and/or the like.

As shown in FIG. 7, process 700 may include receiving information associated with UEs communicatively connected with the device (block 710). For example, the base station (e.g., using processor 420, memory 430, storage component 440, input component 450, communication interface 470, and/or the like) may receive information associated with one or more UEs communicatively connected with the device, as described above in connection with FIGS. 1A-2F. In some implementations, the information associated with the one or more UEs may include one or more distance measurements associated with the one or more UEs, one or more interference measurements associated with the one or more UEs, a quantity of inter-frequency handovers associated with the one or more UEs, a quantity of intra-frequency handovers associated with the one or more UEs, one or more service parameters associated with the one or more UEs, one or more signal strength measurements associated with the one or more UEs, one or more channel quality measurements associated with the one or more UEs, one or more latency parameters associated with the one or more UEs, and/or the like.

As further shown in FIG. 7, process 700 may include generating a score based on the information associated with the one or more UEs (block 720). For example, the base station (e.g., using processor 420, memory 430, storage component 440, and/or the like) may generate a score based on the information associated with the one or more UEs, as described above in connection with FIGS. 1A-2F. In some implementations, the base station may generate the score based on multiple pieces of information from the information associated with the one or more UEs described above. In some implementations, the base station may weight particular types of information such that particular types of information have more of an influence on the score. In some implementations, the weight for a particular type of information may be determined based on the expected impact the type of information may have on the performance of a wireless radio link between the base station and the one or more UEs, based performance goals for the wireless radio link (e.g., throughput, reliability, and/or the like), based on the base station being configured (e.g., by an operator of the base station) to assign the weight to the particular type of information, and/or the like.

As further shown in FIG. 7, process 700 may include, based on the information associated with the one or more UEs, increasing or decreasing a subframe duration of a wireless radio link between the device and the one or more UEs, and/or a subcarrier spacing of the wireless radio link between the device and the one or more UEs (block 730). For example, the base station (e.g., using processor 420, memory 430, storage component 440, and/or the like) may, based on the information associated with the one or more UEs, increase or decrease a subframe duration of a wireless radio link between the device and the one or more UEs, and/or a subcarrier spacing of the wireless radio link between the device and the one or more UEs, as described above in connection with FIGS. 1A-2F. In some implementations, the base station may determine the adjustments by determining an average distance between the base station and the one or more UEs, and may adjust the subframe duration and/or the subcarrier spacing based on the average distance. In some implementations, the base station may determine the adjustments by determining an average mobility of the one or more UEs (e.g., based on changes in the distance measurements over time, based on changes in the signal strength measurements over time, and/or the like), and may adjust the subframe duration and/or the subcarrier spacing based on the average mobility. In some implementations, the base station may determine the adjustments by determining a percentage of the one or more UEs that are indoors, and may adjust the subframe duration and/or the subcarrier spacing based on the percentage.

Process 700 may include additional implementations, such as any single implementation or any combination of implementations described below and/or in connection with one or more other processes described elsewhere herein.

In some implementations, when generating the score, the base station may generate the score based on a percentage of the one or more UEs that are indoors. In some implementations, when generating the score, the base station may generate the score using the information associated with the one or more UEs in a cost function. In some implementations, when increasing or decreasing the subframe duration and/or the subcarrier spacing based on the score, the base station may determine whether the score satisfies a threshold, and may increase or decrease the subframe duration and/or the subcarrier spacing based on whether the score satisfies the threshold.

In some implementations, the information associated with the one or more UEs may include one or more distance measurements associated with the one or more UEs, and, when generating the score, the base station may determine, based on the one or more distance measurements, an average mobility of the one or more UEs, and may generate the score based on the average mobility of the one or more UEs satisfying a threshold or not satisfying the threshold. In some implementations, the base station may determine the average mobility based on changes in signal strength measurements associated with the one or more UEs.

In some implementations, the information associated with the one or more UEs may include one or more distance measurements associated with the one or more UEs, one or more interference measurements associated with the one or more UEs, a quantity of inter-frequency handovers associated with the one or more UEs, and/or a quantity of intra-frequency handovers associated with the one or more UEs.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations described herein provide a device, such as a base station 310, a SON platform, and/or the like, that is capable of adjusting one or more subframe parameters associated with base station 310. In some implementations, base station 310 may receive information associated with one or more UEs 305 communicatively connected with the device, and may adjust, based on the information associated with UEs 305, one or more subframe parameters associated with base station 310. In this way, base station 310 may dynamically adjust subframes of a wireless radio link, associated with base station 310, based on operating conditions in a mobile network in which base station 310 and the one or more UEs 305 are located, based on service parameters associated with the one or more UEs 305, and/or the like. In this way, the device may preserve and/or increase orthogonality of subcarriers included in one or more subframes of the wireless radio link associated with the device, which increases SINR of the wireless radio link, increases throughput on the wireless radio link, decreases ICI, increases the efficiency of the wireless radio link, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    generating, by a device, a score based on a latency factor associated with one or more user equipment (UEs),
        wherein the latency factor is based on:
            a quantity of radio resource connection (RRC) setups associated with the one or more UEs, and
            a quantity of RRC reestablishments associated with the one or more UEs;
    adjusting, by the device and based on the score, one or more subframe parameters associated with the device;
    regenerating, by the device and based on adjusting the one or more subframe parameters, the score; and
    readjusting, by the device and based on regenerating the score, the one or more subframe parameters periodically.

2. The method of claim 1, wherein the score is calculated based on an environmental factor associated with the one or more UEs; and
    wherein the environmental factor is based on:
        a percentage of the one or more UEs that are indoors, and
        an average distance of the one or more UEs from the device; and
    wherein generating the score comprises:
        generating the score based on the environmental factor.

3. The method of claim 1, wherein the score is calculated based on an interference factor associated with the one or more UEs; and
    wherein the interference factor is based on:
        a signal to interference plus noise ratio (SINK) associated with the one or more UEs, and
        a signal to noise ratio (SNR) associated with the one or more UEs; and
    wherein generating the score comprises:
        generating the score based on the interference factor.

4. The method of claim 1, wherein the score is calculated based on a mobility factor associated with the one or more UEs; and
    wherein the mobility factor is based on:
        an average speed associated with the one or more UEs; and
    wherein readjusting the one or more subframe parameters comprises:
        increasing or decreasing a subcarrier spacing based on the mobility factor.

5. The method of claim 1, wherein the score is calculated based on an environmental factor associated with the one or more UEs; and
    wherein the environmental factor is based on:
        a percentage of the one or more UEs that are indoors, and
        an average distance of the one or more UEs from the device; and
    wherein readjusting the one or more subframe parameters comprises:
        increasing or decreasing a subframe duration based on the environmental factor.

6. The method of claim 1, wherein the score is calculated based on an interference factor associated with the one or more UEs; and
    wherein the interference factor is based on:
        whether one or more interference measurements satisfy one or more thresholds; and
    wherein readjusting the one or more subframe parameters comprises:
        increasing or decreasing a subcarrier spacing based on the interference factor.

7. The method of claim 1, further comprising:
    determining that the one or more UEs are transmitting information associated with a particular application;
    determining that the particular application has a particular latency parameter; and
    increasing or decreasing a subframe duration based on the particular latency parameter.

8. A device, comprising:
    one or more memories; and
    one or more processors coupled to the one or more memories, configured to:

generate a score based on a latency factor associated with one or more user equipment (UEs),
wherein the latency factor is based on:
a quantity of radio resource connection (RRC) setups associated with the one or more UEs, and, and
a quantity of RRC reestablishments associated with the one or more UEs;
adjust, based on the score, one or more subframe parameters associated with the device;
regenerate, based on adjusting the one or more subframe parameters, the score; and
readjust, based on regenerating the score, the one or more subframe parameters periodically.

9. The device of claim 8, wherein the score is calculated based on an environmental factor associated with the one or more UEs; and
wherein the environmental factor is based on:
a percentage of the one or more UEs that are indoors, and
an average distance of the one or more UEs from the device; and
wherein the one or more processors, when generating the score, are configured to:
generate the score based on the environmental factor.

10. The device of claim 8, wherein the score is calculated based on an interference factor associated with the one or more UEs; and
wherein the interference factor is based on:
a signal to interference plus noise ratio (SINK) associated with the one or more UEs, and
a signal to noise ratio (SNR) associated with the one or more UEs; and
wherein the one or more processors, when generating the score, are configured to:
generate the score based on the interference factor.

11. The device of claim 8, wherein the score is calculated based on a mobility factor associated with the one or more UEs; and
wherein the mobility factor is based on:
an average speed associated with the one or more UEs; and
wherein the one or more processors, when readjusting the one or more subframe parameters, are configured to:
increase or decrease a subcarrier spacing based on the mobility factor.

12. The device of claim 8, wherein the score is calculated based on an environmental factor associated with the one or more UEs; and
wherein the environmental factor is based on:
a percentage of the one or more UEs that are indoors, and
an average distance of the one or more UEs from the device; and
wherein the one or more processors, when readjusting the one or more subframe parameters, are configured to:
increase or decrease a subframe duration based on the environmental factor.

13. The device of claim 8, wherein the score is calculated based on an interference factor associated with the one or more UEs; and
wherein the interference factor is based on:
whether one or more interference measurements satisfy one or more thresholds; and
wherein the one or more processors, when readjusting the one or more subframe parameters, are configured to:
increase or decrease a subcarrier spacing based on the interference factor.

14. The device of claim 8, wherein the one or more processors are further to:
determine that the one or more UEs are transmitting information associated with a particular application;
determine that the particular application has a particular latency parameter; and
increase or decrease a subcarrier spacing based on the particular latency parameter.

15. A non-transitory computer-readable medium storing instructions, the instructions comprising:
one or more instructions that, when executed by one or more processors of a device, cause the one or more processors to:
generate a score based on a latency factor associated with one or more user equipment (UEs),
wherein the latency factor is based on:
a quantity of radio resource connection (RRC) setups associated with the one or more UEs, and
a quantity of RRC reestablishments associated with the one or more UEs;
adjust, based on the score, one or more subframe parameters associated with the device;
regenerate, based on adjusting the one or more subframe parameters, the score; and
readjust, based on regenerating the score, the one or more subframe parameters periodically.

16. The non-transitory computer-readable medium of claim 15, wherein the score is calculated based on an environmental factor associated with the one or more UEs; and
wherein the environmental factor is based on:
a percentage of the one or more UEs that are indoors, and
an average distance of the one or more UEs from the device; and
wherein the one or more instructions, that cause the one or more processors to generate the score, cause the one or more processors to:
generate the score based on the environmental factor.

17. The non-transitory computer-readable medium of claim 15, wherein the score is calculated based on an interference factor associated with the one or more UEs; and
wherein the interference factor is based on:
a signal to interference plus noise ratio (SINK) associated with the one or more UEs, and
a signal to noise ratio (SNR) associated with the one or more UEs; and
wherein the one or more instructions, that cause the one or more processors to generate the score, cause the one or more processors to:
generate the score based on the interference factor.

18. The non-transitory computer-readable medium of claim 15, wherein the score is calculated based on a mobility factor associated with the one or more UEs; and
wherein the mobility factor is based on:
an average speed associated with the one or more UEs; and
wherein the one or more instructions, that cause the one or more processors to generate the score, cause the one or more processors to:
generate the score based on the mobility factor.

19. The non-transitory computer-readable medium of claim 15, wherein the score is calculated based on an environmental factor associated with the one or more UEs; and wherein the environmental factor is based on:
  a percentage of the one or more UEs that are outdoors, and
  an average distance of the one or more UEs from the device; and
wherein the one or more instructions, that cause the one or more processors to generate the score, cause the one or more processors to:
  generate the score based on the environmental factor.

20. The non-transitory computer-readable medium of claim 15, wherein the one or more instructions, when executed by the one or more processors, further cause the one or more processors to:
  determine that the one or more UEs are transmitting information associated with a particular application;
  determine that the particular application has a particular latency parameter; and
  increase or decrease a subframe duration or a subcarrier spacing based on the particular latency parameter.

* * * * *